US007495728B2

(12) United States Patent
Kim et al.

(10) Patent No.: US 7,495,728 B2
(45) Date of Patent: Feb. 24, 2009

(54) TRANSFLECTIVE LIQUID CRYSTAL DISPLAY DEVICE HAVING COLOR FILTER-ON-THIN FILM TRANSISTOR (COT) STRUCTURE AND METHOD OF FABRICATING THE SAME

(75) Inventors: Woong-Kwon Kim, Gyeonggi-do (KR); Se-June Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/541,699

(22) Filed: Oct. 3, 2006

(65) Prior Publication Data
US 2007/0064185 A1  Mar. 22, 2007

Related U.S. Application Data

(62) Division of application No. 10/787,409, filed on Feb. 27, 2004, now Pat. No. 7,133,104.

(30) Foreign Application Priority Data
Feb. 28, 2003 (KR) ............ 10-2003-0012615

(51) Int. Cl.
*G02F 1/1335* (2006.01)
(52) U.S. Cl. .................................... 349/114
(58) Field of Classification Search ............ None
See application file for complete search history.

(56) References Cited

U.S. PATENT DOCUMENTS 6,195,140 B1   2/2001   Kubo et al. ............ 349/44
6,211,928 B1 * 4/2001   Oh et al. ............... 349/43
6,624,860 B1 * 9/2003   Narutaki et al. ........ 349/106
6,879,359 B1   4/2005   Kikkawa et al. ........ 349/113
2001/0022634 A1 9/2001   Chung et al. ........... 349/43
2003/0076463 A1 * 4/2003 Ozawa et al. ........... 349/113

FOREIGN PATENT DOCUMENTS

| JP | 07-072473 | 3/1995 |
| JP | 10-039292 | 2/1998 |
| JP | 10-186379 | 7/1998 |

(Continued)

*Primary Examiner*—David Nelms
*Assistant Examiner*—Lucy P Chien
(74) *Attorney, Agent, or Firm*—McKenna Long & Aldridge LLP

(57) ABSTRACT

A transflective liquid crystal display device includes a thin film transistor disposed at a corner of a pixel region, the thin film transistor including a gate electrode, a semiconductor layer, a source electrode, and a drain electrode, a reflector disposed in the pixel region and spaced apart from the thin film transistor, the reflector formed of the same material as one of the gate, source, and drain electrodes, a color filter disposed within the pixel region, the color filter having one of red, green, and blue colors, a black matrix over the thin film transistor along color filter borders of adjacent pixel regions, and a pixel electrode formed of a transparent conductive material adjacent to the color filter, the pixel electrode having a first end portion contacting the drain electrode of the thin film transistor, wherein the pixel region is divided into a reflective portion including the reflector and a transmissive portion absent of the reflector.

7 Claims, 26 Drawing Sheets

FOREIGN PATENT DOCUMENTS

| | | |
|---|---|---|
| JP | 11-109417 | 4/1999 |
| JP | 2000-019563 | 1/2000 |
| JP | 2000-155336 | 6/2000 |
| JP | 2000-267081 | 9/2000 |
| JP | 2001-005038 | 1/2001 |
| JP | 2002-311445 | 10/2002 |
| JP | 2003-029300 | 1/2003 |

\* cited by examiner

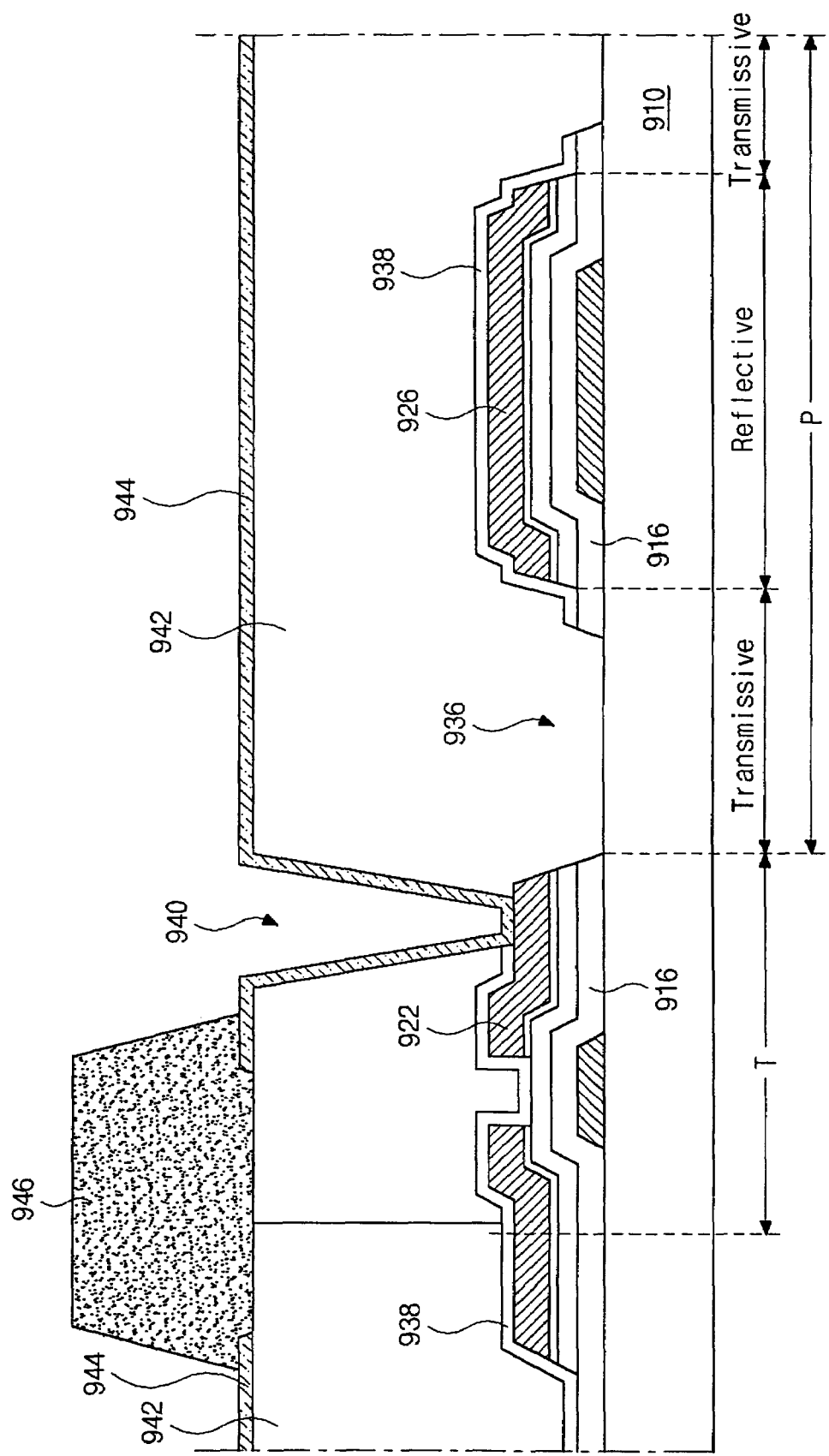

TRANSFLECTIVE LIQUID CRYSTAL DISPLAY DEVICE HAVING COLOR FILTER-ON-THIN FILM TRANSISTOR (COT) STRUCTURE AND METHOD OF FABRICATING THE SAME

This Application is a Divisional of U.S. patent application Ser. No. 10/787,409, filed Feb. 27, 2004, now U.S. Pat. No. 7,133,104 now allowed, which is hereby incorporated by reference.

The present invention claims the benefit of Korean Patent Application No. P2003-0012615 filed in Korea on Feb. 28, 2003, which is hereby incorporated by reference.

BACKGROUND OF THE INVENTION

1. Field of the Invention

The present invention relates to a liquid crystal display (LCD) device, and more particularly, to an array substrate having a color filter-on-thin film transistor (COT) structure.

2. Discussion of the Related Art

In general, since flat panel display devices are thin, light weight, and have low power consumption, they are used in portable display devices. Among the various types of flat panel display devices, liquid crystal display (LCD) devices are commonly used in laptop computers and desktop computer monitors because of their superior resolution, color image display, and display quality.

In the LCD devices, optical anisotropy and polarization characteristics of liquid crystal molecules are utilized to generate images, wherein liquid crystal molecules have specific alignment directions that result from their inherent properties. The specific alignment directions of the liquid crystal molecules may be modified by application of an electric field. Thus, due to the optical anisotropy, incident light is refracted according to the alignment of the liquid crystal molecules.

The LCD devices include upper and lower substrates each having electrodes that are spaced apart and face each other, and a liquid crystal material interposed between the upper and lower substrates. Accordingly, when a voltage is applied to each of the electrodes of the upper and lower substrates, the alignment direction of the liquid crystal molecules is changed in accordance with the applied voltage, thereby displaying images. By controlling the applied voltage, the LCD device provides various light transmittances to display image data.

The liquid crystal display (LCD) devices are commonly employed in office automation (OA) and video equipment due to their light weight, slim design, and low power consumption. Among the different types of LCD devices, active matrix LCDs (AM-LCDs), which have thin film transistors and pixel electrodes arranged in a matrix form, provide high resolution and superiority in displaying moving images.

In general, the LCD device displays an image using light emitted from a backlight device that is positioned under the LCD panel. However, the LCD only utilizes 3~8% of the incident light generated from the backlight device, thereby providing inefficient optical modulation. Thus, the LCD device using the backlight device usually consumes a significant amount of electrical energy in order to provide light of reasonable brightness.

In order to overcome the high power consumption, there is a need for a transflective LCD device that utilizes ambient light and artificial light generated from the backlight device. Specifically, the transflective LCD device may be used during daytime hours as well as nighttime because the transflective LCD device can be changed to operate in one of a transmissive mode and a reflective mode depending on the desired condition of operation. The transflective LCD device includes a reflector within each pixel where a transparent electrode mainly exists to electrically communicate with the transparent electrode, and then function as a pixel electrode with the transparent electrode.

FIG. 1 is a cross sectional view of a transflective liquid crystal display device according to the related art. In FIG. 1, first and second substrates 10 and 50 are spaced apart and face each other, wherein a front surface of the first substrate 10 includes a thin film transistor T having a gate electrode 12, a semiconductor layer 16, and source and drain electrodes 18 and 20. In addition, a gate insulation layer 14 is formed on the first substrate 10 and is interposed between the gate electrode 12 and the semiconductor layer 16 in the thin film transistor T, and a first passivation layer 22 is formed on the gate insulation layer 14 to cover the thin film transistor T. A reflector 24 that reflects incident light is formed on the passivation layer 22 within an area where a reflective portion is defined within a pixel region P. A second passivation layer 26 is formed over the first substrate 10 to cover the reflector 24, and the first and second passivation layers 22 and 26 and the reflector 24 together include a drain contact hole 28 that exposes a portion of the drain electrode 20. A pixel electrode 30 is disposed on the second passivation layer 26 within the pixel region P, which is formed of a transparent conductive material, and contacts the drain electrode 20 through the drain contact hole 28. In addition, a data line 21 is formed on the gate insulation layer 14 and is connected with the source electrode 18. Although not shown in FIG. 1, a gate line is formed with the gate electrode 12 on the first substrate 10 and defines the pixel region P while perpendicularly crossing the data line 21.

In FIG. 1, a black matrix 52 is formed on a rear surface of the second substrate 50 to correspond in position to the data line 21 and the gate line (not shown). A color filter layer 54 having red, green, and blue colors is formed on the rear surface of the second substrate 50 while covering the black matrix 52. In addition, a common electrode 56 is disposed on a rear surface of the color filter layer 54, and is formed of the same material as the pixel electrode 30, such as a transparent conductive material. Moreover, a liquid crystal layer 70 is interposed between the pixel electrode 30 and the common electrode 56. Accordingly, the pixel region P is divided into a reflective portion, which corresponds to the reflector 24, and a transmissive portion, which corresponds to the pixel electrode except for the reflective portion.

The reflective LCD device, as shown in FIG. 1, is fabricated by sequential processes including: a gate process (forming the gate electrode and line); an active process (forming the semiconductor layer); a source/drain process (forming the source and drain electrodes and the data line); a first contact hole process (forming the first passivation layer); a reflective process (forming the reflector); a second contact hole process (forming the second passivation layer); a transmissive process (forming the pixel electrode); a black matrix process (forming the black matrix); a color filter process (forming the red, green, and blue color filters); a common electrode process (forming the common electrode); and an aligning process (attaching the first and second substrates and interposing the liquid crystal therebetween). Accordingly, the fabrication processes for manufacturing the reflective LCD device of FIG. 1 is extremely complicated. In addition, a second contact hole process for forming the second passivation layer 26 may be necessary since the second passivation layer 26 prevents electrochemical reaction between the reflector 24 and the pixel electrode 30.

The reflector 24 commonly includes aluminum (Al) or silver (Ag) material having superior reflectivity, and the pixel electrode 30 is commonly formed of the transparent conductive material, such as indium-tin-oxide (ITO). When the reflector 24 and the pixel electrode 30 are dipped together into a solution, the indium ion ($In^{3+}$) of ITO obtains electrons and becomes an indium (In) metal and aluminum (Al) of the reflector loses electrons and becomes the aluminum ion ($Al^{3+}$). As a result, the transparent conductive material (ITO) is damaged, thereby losing its transparency and becomes darkened. Therefore, the second passivation layer 26 is necessary between the reflector 24 and the pixel electrode 30 in order to isolate the reflector 24 from the pixel electrode 30.

The transflective LCD device of FIG. 1 may be operated in both the reflective mode and the transmissive mode. In the reflective mode, incident light L1 is reflected from the reflector 24 and is directed toward the second substrate 50, whereby the incident light encounters and passes through the color filter layer 54 twice. Conversely, artificial light L2 generated from the backlight device (not shown) only passes through the color filter layer 54 once. Accordingly, the light L1 and L2 colored by the color filter layer 54 to display color images have different light paths in the reflective mode and the transmissive mode, respectively. Because of these different light paths, color reproduction in the reflective portion is different from that in the transmissive portion even though the same color filter is utilized.

To overcome the problem of different color reproduction, the color filter in the reflective portion is formed to have a one-half thickness than that in the transmissive portion. Thus, the light path of incident light is shortened when the incident light passes through the color filter in the reflective mode.

FIG. 2 is a partial cross sectional view of a transflective LCD device according to the related art. In FIG. 2, a transparent interlayer 82 is formed on a rear surface of a upper substrate 80, and a color filter 84 is formed on the rear surface of the upper substrate 80 to cover the transparent interlayer 82. The transparent interlayer 82 corresponds to a reflective portion where a reflector 94 is disposed. A first portion 84a of the color filter 84 has a first thickness dl that corresponds to the reflective portion, and a second portion 84b of the color filter 84 has a second thickness d2 that corresponds to the transmissive portion. Since the transparent interlayer 82 is formed within the reflective portion between the substrate 80 and the color filter 84, the first thickness d1 is less than the second thickness d2 by as much as the thickness of the transparent interlayer 82. When incident light LL1 is reflected on the reflector 94, the incident light LL1 transits twice through the first portion 84a of the color filter 84 whose thickness is almost one-half that of the second portion of the color filter 84. Therefore, the light path of incident light LL1 is the same as that of artificial light LL2 that passes through the second portion 84b.

However, since the transparent interlayer 82 is provided to lower the thickness of the first portion 84a of the color filter 84, supplementary processes for forming the transparent interlayer 82 are required. Second, it is essential to form the color filter 84 to be planar in order to form a common electrode on its surface. Accordingly, much more complicated process steps are necessary for the transflective LCD device, and fabrication costs of transflective LCD device will increase.

SUMMARY OF THE INVENTION

Accordingly, the present invention is directed to an array substrate having a color filter-on-thin film transistor (COT) structure for a transflective liquid crystal display device that substantially obviates one or more of the problems due to limitations and disadvantages of the related art.

An object of the present invention is to provide a transflective liquid crystal display device having a reduced number of processing steps.

Another object of the present invention is to provide a transflective liquid crystal display device having increased color reproduction.

Another object of the present invention is to provide a method of fabricating a transflective liquid crystal display device having simplified and stabilized fabricating processes to increase manufacturing yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages of the present invention, as embodied and broadly described, a transflective liquid crystal display device includes a thin film transistor disposed at a corner of a pixel region, the thin film transistor including a gate electrode, a semiconductor layer, a source electrode, and a drain electrode, a reflector disposed in the pixel region and spaced apart from the thin film transistor, the reflector formed of the same material as one of the gate, source, and drain electrodes, a color filter disposed within the pixel region, the color filter having one of red, green, and blue colors, a black matrix over the thin film transistor along color filter borders of adjacent pixel regions, and a pixel electrode formed of a transparent conductive material adjacent to the color filter, the pixel electrode having a first end portion contacting the drain electrode of the thin film transistor, wherein the pixel region is divided into a reflective portion including the reflector and a transmissive portion absent of the reflector.

In another aspect, a transflective liquid crystal display device includes a substrate, a gate electrode disposed in a thin film transistor region on the substrate, a first buffer pattern disposed in a pixel region on the substrate and spaced apart from the gate electrode, a gate insulation layer formed on the substrate to cover the gate electrode and the first buffer pattern, a semiconductor layer on the gate insulation layer over the gate electrode, a second buffer pattern formed of the same material as the semiconductor layer and formed during the same time as formation of semiconductor layer, the second buffer pattern disposed above the first buffer pattern in the pixel region, source and drain electrodes formed on the semiconductor layer and space apart from each other, a reflector on the second buffer pattern, the reflector formed of the same material as the source and drain electrodes, a color filter disposed within the pixel region and having one of red, green, and blue colors, a black matrix formed above a thin film transistor in the thin film transistor region, the thin film transistor includes the gate electrode, the semiconductor layer, and the source and drain electrodes, the black matrix covering the thin film transistor except for a portion of the drain electrode and bordering adjacent color filters of neighboring pixel regions, and a pixel electrode disposed in the pixel region and formed of a transparent conductive material, the pixel electrode adjacent to the color filter and having a first end portion contacting the drain electrode of the thin film transistor, wherein the pixel region is divided into a reflective portion that includes the reflector and a transmissive portion that is absent of the reflector, the color filter has a first thickness in the transmissive portion and a second thickness in the reflective portion, and the first thickness is larger than the second thickness.

In another aspect, a transflective liquid crystal display device includes a substrate, a gate electrode disposed in a thin film transistor region on the substrate, a first buffer pattern disposed in a pixel region on the substrate and spaced apart from the gate electrode, a gate insulation layer formed on the substrate to cover the gate electrode and the first buffer pattern, a semiconductor layer on the gate insulation layer over the gate electrode, a second buffer pattern disposed above the first buffer pattern in the pixel region and formed of the same material as the semiconductor layer and formed during the same time as the semiconductor layer, source and drain electrodes formed on the semiconductor layer, the source and drain electrodes have the same planar shape with the semiconductor layer except for a space between the source and drain electrodes, a reflector on the second buffer pattern, the reflector is formed of the same material as the source and drain electrodes and has the same planar shape as the second buffer pattern, a color filter disposed within the pixel region, and having one of red, green, and blue colors, a black matrix formed above a thin film transistor in the thin film transistor region, the thin film transistor includes the gate electrode, the semiconductor layer, and the source and drain electrodes, the black matrix covering the thin film transistor except for a portion of the drain electrode and borders adjacent color filters of the neighboring pixel regions, a passivation layer covering the thin film transistor and the reflector, the passivation layer exposing an edge portion of the drain electrode, and a pixel electrode disposed in the pixel region and formed of a transparent conductive material, the pixel electrode adjacent to the color filter and contacting the edge portion of the drain electrode of the thin film transistor, wherein the pixel region is divided into a reflective portion having the reflector and a transmissive portion absent of the reflector, the color filter has a first thickness in the transmissive portion and a second thickness in the reflective portion, and the first thickness is larger than the second thickness.

In another aspect, a transflective liquid crystal display device includes a substrate, a gate electrode disposed in a thin film transistor region on the substrate, a first buffer pattern disposed in a pixel region on the substrate and spaced apart from the gate electrode, a gate insulation layer formed on the substrate to cover the gate electrode and the first buffer pattern, a semiconductor layer on the gate insulation layer over the gate electrode, a second buffer pattern formed of the same material as the semiconductor layer and formed at the same time as the semiconductor layer, the second buffer pattern disposed above the first buffer pattern in the pixel region, source and drain electrodes formed on the semiconductor layer and space apart from each other, the source and drain electrodes have the same planar shape with the semiconductor layer except for a space between the source and drain electrodes, a reflector on the second buffer pattern, the reflector is formed of the same material as the source and drain electrodes and has the same planar shape as the second buffer pattern, a thin film transistor disposed in the thin film transistor region, the thin film transistor including the gate electrode, the semiconductor layer, and the source and drain electrodes, a passivation layer covering the thin film transistor and the reflector, the passivation layer exposing an edge portion of the drain electrode, and a color filter disposed over an entire surface of the substrate on the passivation layer, the color filter having one of red, green, and blue colors and having a drain contact hole exposing the edge portion of the drain electrode, and a pixel electrode formed of a transparent conductive material and disposed over the color filter in the pixel region, the pixel electrode contacting the edge portion of the drain electrode through the drain contact hole, wherein the pixel region is divided into a reflective portion having the reflector and a transmissive portion absent of the reflector, the color filter has a first thickness in the transmissive portion and a second thickness in the reflective portion, and the first thickness is larger than the second thickness.

In another aspect, a method of fabricating a transflective liquid crystal display device includes forming a gate electrode and a first buffer pattern on a substrate using a first mask process, forming a gate insulation layer on the substrate to cover the gate electrode and the first buffer pattern, forming a pure amorphous silicon layer, a doped amorphous silicon layer, and a metal layer in sequence on the gate insulation layer, patterning the pure amorphous silicon layer, the doped amorphous silicon layer, and the metal layer simultaneously using a second mask process to form a semiconductor layer over the gate electrode, source and drain electrodes on the semiconductor layer, a second buffer pattern over the first buffer pattern, and a reflector on the second buffer pattern, forming a first passivation layer on the gate insulation layer to cover the source and drain electrodes and the reflector, forming a black matrix on the first passivation layer to cover the gate electrode, the source electrode, and the drain electrode except for an edge portion of the drain electrode, forming a second passivation layer on the first passivation layer to cover the black matrix, patterning the first and second passivation layers and the gate insulation layer to form an opening that exposes the edge portion of the drain electrode and portions of the substrate, forming a first transparent conductive layer over an entire surface of the substrate, the first transparent conductive layer contacting the exposed edge portion of the drain electrode and the exposed portion of the substrate, forming a color filter on the first transparent conductive layer in a pixel region to cover the reflector, the color filter having one of red, green, and blue colors, forming a second transparent conductive layer on the color filter and on an exposed portion of the first transparent conductive layer, patterning the first and second transparent conductive layers simultaneously to form first and second transparent pixel electrodes between where the color filter is interposed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIGS. 10A to 10D are cross sectional views of another exemplary transflective LCD devices each having a color filter-on-thin film transistor structure and buffer patterns according to the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
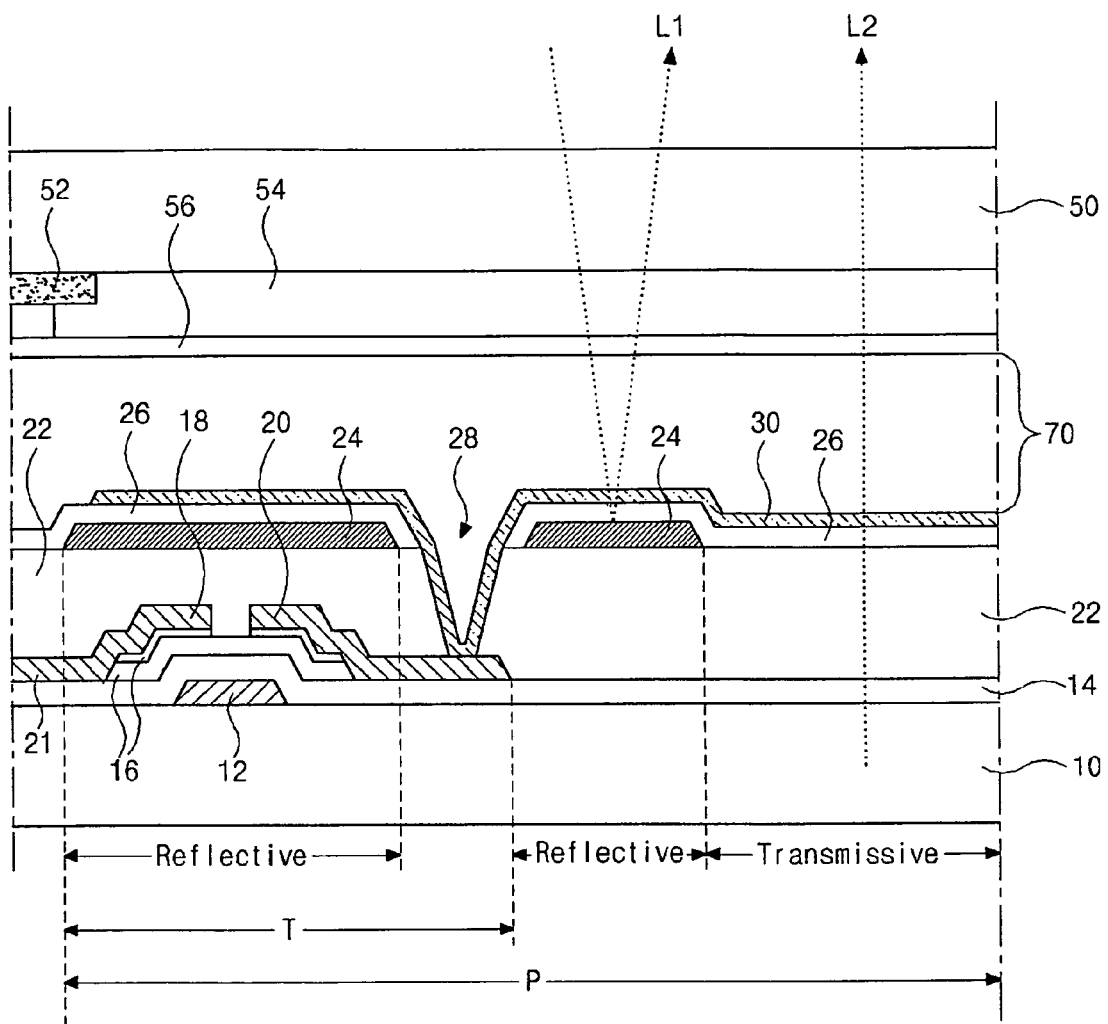
FIG. 1 is a cross sectional view of a transflective liquid crystal display device according to the related art.
Figure 2:
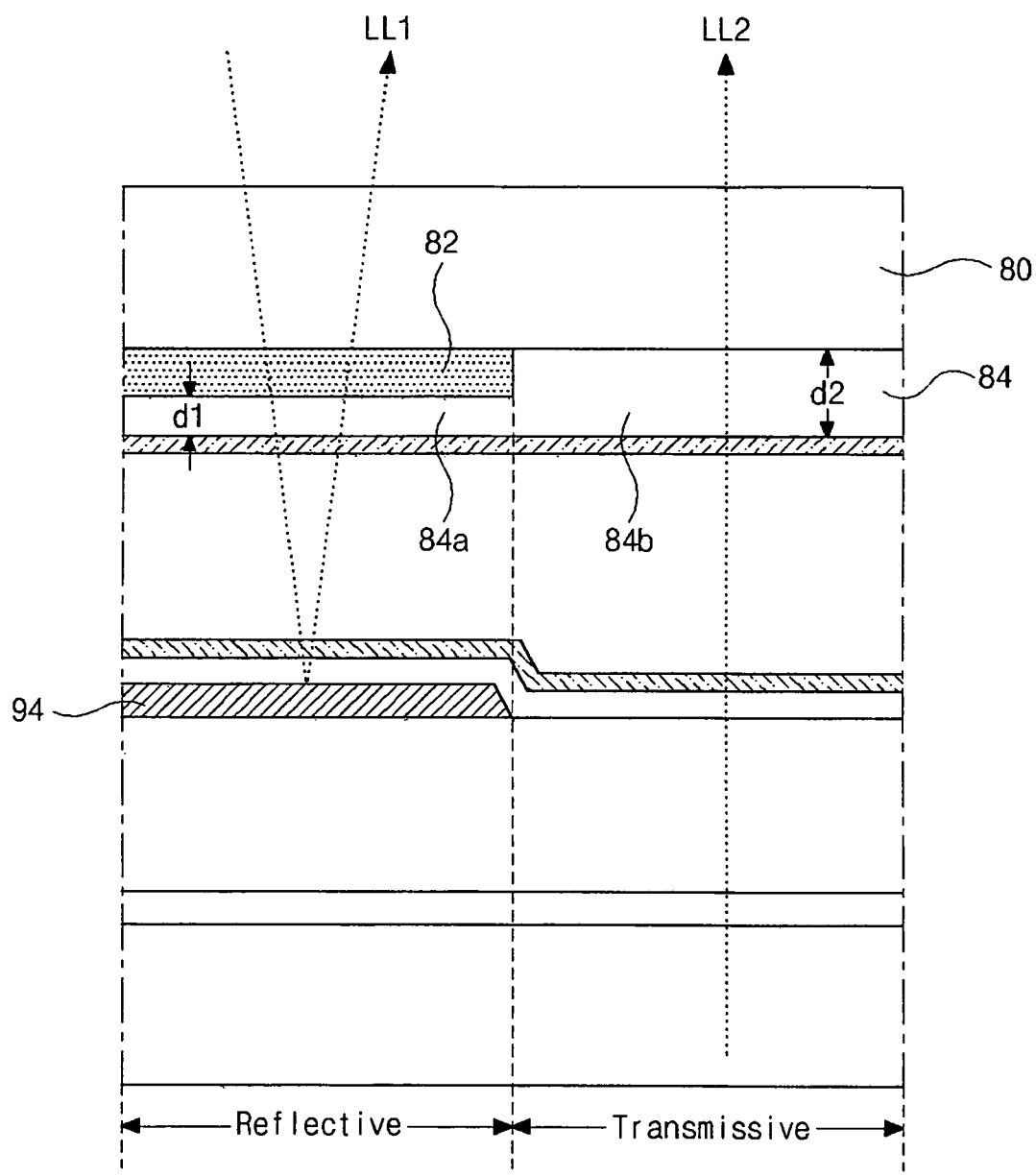
FIG. 2 is a partial cross sectional view of a transflective LCD device according to the related art.
Figure 3:
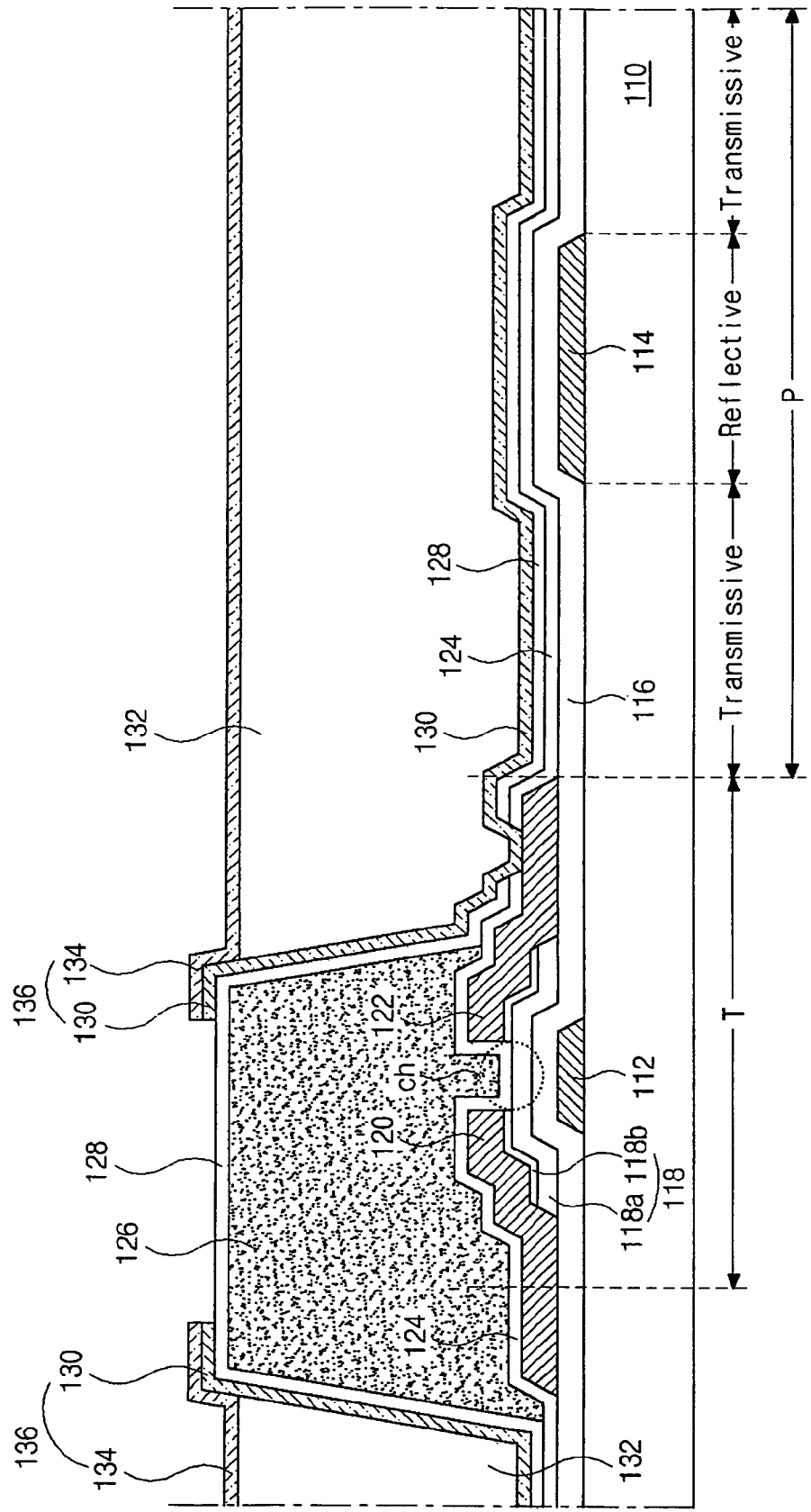
FIG. 3 is a cross sectional view of an exemplary transflective liquid crystal display device having a color filter-on-thin film transistor structure according to the present invention.

FIG. 3 is a cross sectional view of an exemplary transflective liquid crystal display device having a color filter-on-thin film transistor structure according to the present invention. In FIG. 3, a gate electrode 112 may be formed on a substrate 110, and a reflector 114 may be formed on the substrate 110 within a pixel region P. The reflector 114 may be spaced apart from the gate electrode 112 such that an area where the reflector is disposed may become a reflective portion. The gate electrode 112 and the reflector 114 may be formed of the same material during the same fabrication process. In addition, a gate insulating layer 116 may be formed on the substrate 110 to cover the gate electrode 112 and the reflector 114, and a semiconductor layer 118 may be disposed on the gate insulating layer 116, especially above the gate electrode 112. The semiconductor layer 118 may include a first layer 118a of intrinsic amorphous silicon and a second layer 118b of extrinsic amorphous silicon. The first layer 118a may be referred to as an active layer, and a second layer 118b may be referred to as an ohmic contact layer. In addition, source and drain electrodes 120 and 122 may be formed on the semiconductor layer 118, and a data line 124 may be formed on the gate insulating layer 116 to be connected to the source electrode 120. As shown in FIG. 3, an exposed portion of the ohmic contact layer 118b between the source and drain electrodes 120 and 122 may be removed to expose a portion of the active layer 118a, thereby forming a channel ch on the active layer 118a. Accordingly, the gate electrode 112, the semiconductor layer 118, and the source and drain electrodes 120 and 122 may constitute a thin film transistor T.

In FIG. 3, a first passivation layer 124 may be formed on the gate insulating layer 116 over an entire surface of the substrate 110 to cover the thin film transistor T. In addition, a black matrix 126 may be formed on the first passivation layer 124, especially covering the data line 124 and the thin film transistor T except for a portion of the drain electrode 122. A second passivation layer 128 may be disposed on the first passivation layer 124 to cover the black matrix 126, wherein the first and second passivation layers 124 and 128 may have a drain contact hole that exposes a portion of the drain electrode 122. Next, a first transparent electrode 130 may be formed on the second passivation layer 128 within the pixel region P, wherein the first transparent electrode 130 may contact the drain electrode 122 through the drain contact hole, and may overlap a portion of the black matrix 126. Although not shown, the black matrix 126 may be disposed to correspond to a gate electrode (not shown) so that it defines the pixel region P where a color filter 132 may be disposed, wherein the black matrix 126 may function as a border of neighboring color filters. Meanwhile, the first passivation layer 128 may be omitted depending on a fabrication process of the black matrix and material used to fabricate the black matrix. For example, in FIG. 3, the black matrix 126 may be a black resin.

In FIG. 3, a color filter 132 having red, green, or blue colors may be formed on the first transparent electrode 130 within the pixel region P, and a second transparent electrode 134 may be formed on color filter 132 to contact the first transparent electrode 130, wherein the second transparent electrode 134 may completely cover the color filter 132. The first and second transparent electrodes 130 and 134 may constitute a pixel electrode 136, and may be referred to as a sandwich pixel electrode since the color filter 132 may be interposed between the first and second transparent electrodes 130 and 134. Accordingly, the pixel region P may be divided into the reflection portion where the reflector 114 is formed and the transmissive portion where the other transparent layers are formed.

According to the exemplary transflective liquid crystal display device of FIG. 3, the color filter and the thin film transistor may be disposed together over the substrate, thereby providing a high aperture ratio. In addition, the reflector may be formed simultaneously with formation of the gate electrode, thereby reducing fabrication process steps. Moreover, since the insulators may be formed between the reflector and the transparent pixel electrode, additional processes for forming the insulating layer may not be necessary.

Figure 4:
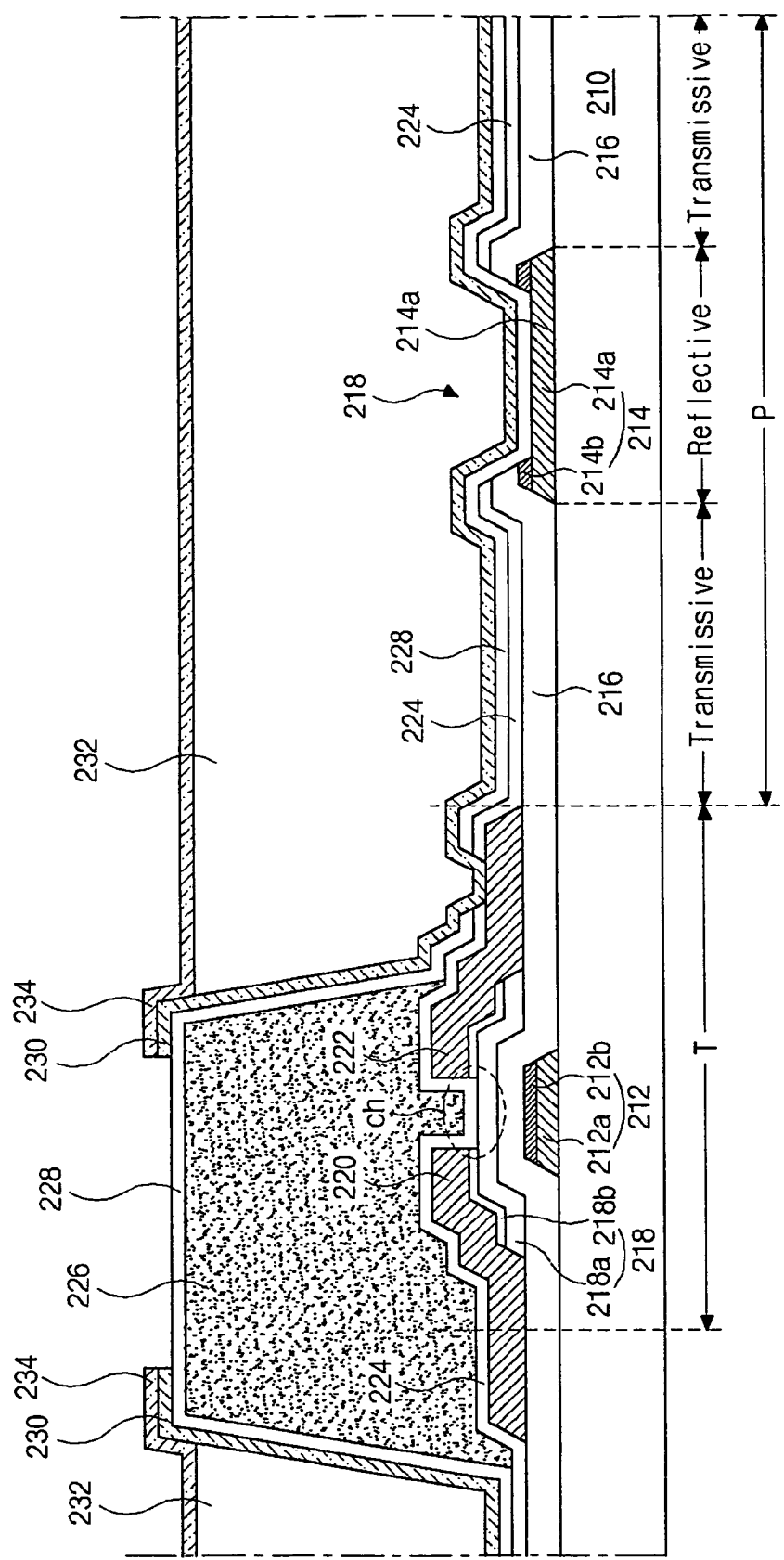
FIG. 4 is a cross sectional view of another exemplary transflective liquid crystal display device having a color filter-on-thin film transistor structure according to the present invention.

FIG. 4 is a cross sectional view of another exemplary transflective liquid crystal display device having a color filter-on-thin film transistor structure according to the present invention. In FIG. 4, a gate electrode 212 may be formed on a substrate 210, and a reflector 214 may be formed on the substrate 210 within a pixel region P, wherein the reflector 214 may be spaced apart from the gate electrode 212, such that an area where the reflector 214 is disposed may become a reflective portion. The gate electrode 212 and the reflector 214 together may have a double-layered structure, wherein the gate electrode 212 may have a first metal layer 212a and a second metal layer 212b, and the reflector 214 may have a first metal layer 214a and a second metal layer 214b. The first metal layers 212a and 214a may include metallic material having low electrical resistance, and the second metal layers 212b and 214b may include metallic material having excellent chemical resistance. For example, the first metal layers 212a and 214a may include aluminum (Al) and the second metal layers 212b and 214b may include molybdenum (Mo). A first metal for the first layers 212a and 214a and a second metal for the second layers 212b and 214b may be sequentially formed on the substrate 210, and then may be patterned using simultaneous photolithography processes.

In FIG. 4, a gate insulating layer 216 may be formed on the substrate 210 to cover the gate electrode 212 and the reflector 214, and a semiconductor layer 218 may be disposed on the gate insulating layer 216, especially above the gate electrode 212. The semiconductor layer 218 may include a first layer 218a of intrinsic amorphous silicon and a second layer 218b of extrinsic amorphous silicon, wherein the first layer 218a may be referred to as an active layer and the second layer 218b may be referred to as an ohmic contact layer. In addition, source and drain electrodes 220 and 222 may be formed on the semiconductor layer 218, and a data line 224 may be formed on the gate insulating layer 216 to be connected with the source electrode 220. Then, an exposed portion of the ohmic contact layer 218b may be removed to expose a portion of the active layer 218a between the source and drain electrodes 220 and 222, thereby forming a channel ch on the active layer 218a. Accordingly, the gate electrode 212, the semiconductor layer 218, and the source and drain electrodes 220 and 222 may constitute a thin film transistor T.

In FIG. 4, a first passivation layer 224 may be formed on the gate insulating layer 216 over an entire surface of the substrate 210 to cover the thin film transistor T, wherein portions of the gate insulating layer 216 and first passivation layer 224 may be removed to form an opening 218 that exposes the second metal layer 214b of the reflector 214. Accordingly, the exposed second metal layer 214b may be eliminated to expose the underlying first metal layer 214a. The first metal layer 214a of the reflector 214 may be exposed since the first metal for the first metal layer 214a, such as aluminum (Al), may have a better reflectivity than the second metal for the second metal layer 214b, such as molybdenum (Mo). The process of forming the opening 218 may be performed at the same time as formation of a drain contact hole that exposes a portion of the drain electrode 222 through the first passivation layer 224. If the second metal layer 214b is molybdenum (Mo), the gate insulation layer 216, the first passivation layer 224, and the second metal layer 216b may be simultaneously patterned throughout the same dry etching process. Thus, an additional process of removing the second metal layer 214b may not be necessary.

In FIG. 4, a black matrix 226 may be formed on the first passivation layer 224, especially covering the data line 224 and the thin film transistor T, except for a portion of the drain electrode 222. In addition, a second passivation layer 228 may be disposed over an entire surface of the substrate 210 to cover the patterned first passivation layer 224 and the black matrix 226, wherein the first and second passivation layers 224 and 228 may have a drain contact hole that exposes a portion of the drain electrode 222. A first transparent electrode 230 may be formed on the second passivation layer 228 within the pixel region P, and may contact the drain electrode 222 through the drain contact hole and may overlap a portion of the black matrix 226. Although not shown, the black matrix 226 may be disposed to correspond to a gate electrode (not shown) so that it defines the pixel region P where a color filter may be disposed, wherein the black matrix 226 may function as a border of neighboring color filters 232. Next, a color filter 232 having red, green, or blue color may be formed on the first transparent electrode 230 within the pixel region P. A second transparent electrode 234 may be formed on color filter 232 to contact the first transparent electrode 230, wherein the second transparent electrode 234 may completely cover the color filter 232. Since the second transparent electrode 234 may contact the first transparent electrode 230, it may electrically communicate with the thin film transistor T via the first transparent electrode 230. The first and second transparent electrodes 230 and 234 may constitute a pixel electrode that may be referred to as a sandwich pixel electrode since the color filter 232 may be interposed between the first and second transparent electrodes 230 and 234. Accordingly, the pixel region P may be divided into the reflection portion where the reflector 214 is formed and the transmissive portion where the other transparent layers are formed.

Figure 5:
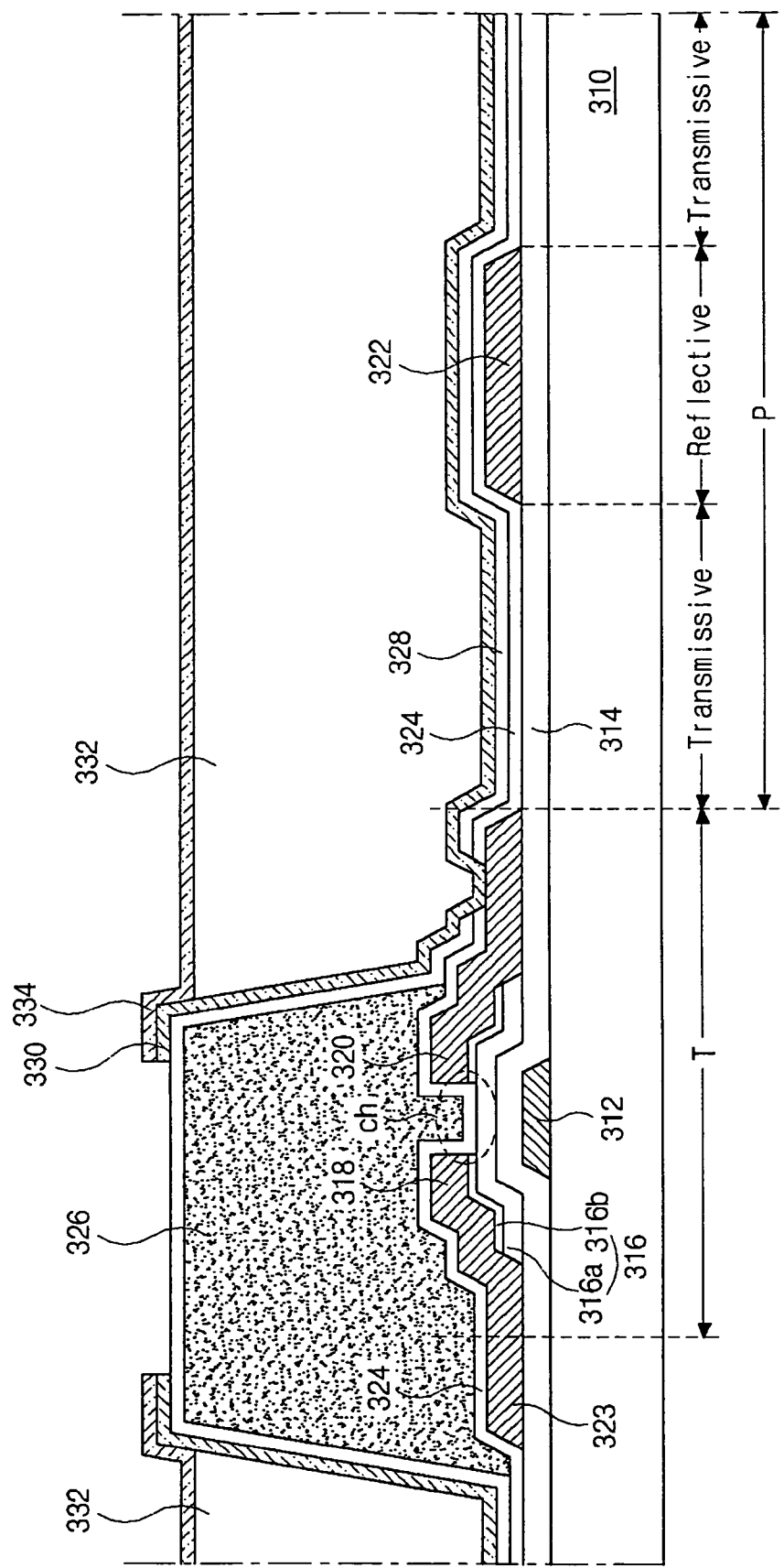
FIG. 5 is a cross sectional view of another exemplary transflective liquid crystal display device having a color filter-on-thin film transistor structure according to the present invention.

FIG. 5 is a cross sectional view of another exemplary transflective liquid crystal display device having a color filter-on-thin film transistor structure according to the present invention. In FIG. 5, a gate electrode 312 may be formed on a substrate 310, and a gate insulating layer 314 may be formed on the substrate 310 to cover the gate electrode 312. In addition, a semiconductor layer 316 may be disposed on the gate insulating layer 314, especially covering the gate electrode 312, and may include a first layer 316a of intrinsic amorphous silicon and a second layer 316b of extrinsic amorphous silicon. The first layer 316a may be referred to as an active layer, and a second layer 316b may be referred to as an ohmic contact layer.

Next, source and drain electrodes 318 and 320 may be disposed on the semiconductor layer 316, and a data line 323 may be formed on the gate insulating layer 314 to be connected with the source electrode 318. In addition, a reflector 322 may be formed on the gate insulating layer 314 within the pixel region P and may be spaced apart from the drain electrode 320. Accordingly, an area where the reflector 322 may be disposed may be defined as a reflective portion. The source electrode 318, the drain electrode 320, the reflector 322, and the data line 323 may be formed together using the same patterning process and the same metallic material. Accordingly, an exposed portion of the ohmic contact layer 316b between the source and drain electrodes 318 and 320 may be removed to expose a portion of the active layer 316a, thereby forming a channel ch on the active layer 316a. Thus, the gate electrode 312, the semiconductor layer 316, and the source and drain electrodes 318 and 320 may constitute a thin film transistor T.

In FIG. 5, a first passivation layer 324 may be formed on the gate insulating layer 314 over an entire surface of the substrate 310 to cover the thin film transistor T and the reflector 322. Then, a black matrix 326 may be formed on the first passivation layer 324, especially covering the data line 323 and the thin film transistor T, except for a portion of the drain electrode 320. Next, a second passivation layer 328 may be disposed on the first passivation layer 324 to cover the black matrix 326, wherein the first and second passivation layers 324 and 328 may have a drain contact hole that exposes a portion of the drain electrode 320.

Then, a first transparent electrode 330 may be formed on the second passivation layer 328 within the pixel region P, such that the first transparent electrode 330 may contact the drain electrode 320 through the drain contact hole and may overlap a portion of the black matrix 326. Although not shown, the black matrix 326 may be disposed to correspond to a gate electrode (not shown) so that it defines the pixel region P where a color filter may be disposed, wherein the black matrix 326 may function as a border of neighboring color filters. Next, a color filter 332 having red, green, or blue colors may be formed on the first transparent electrode 330 within the pixel region P. Then, a second transparent electrode 334 may be formed on color filter 332 to contact the first transparent electrode 330 so that the second transparent electrode 334 may completely cover the color filter 332. Since the second transparent electrode 334 may contact the first transparent electrode 330, the second transparent electrode 334 may electrically communicate with the thin film transistor T throughout the first transparent electrode 330. The first and second transparent electrodes 330 and 334 may constitute a pixel electrode referred to as a sandwich pixel electrode since the color filter 332 may be interposed between the first and second transparent electrodes 330 and 334. Accordingly, the pixel region P may be divided into the reflection portion where the reflector 322 is formed and the transmissive portion where the other transparent layers are formed.

Figure 6:
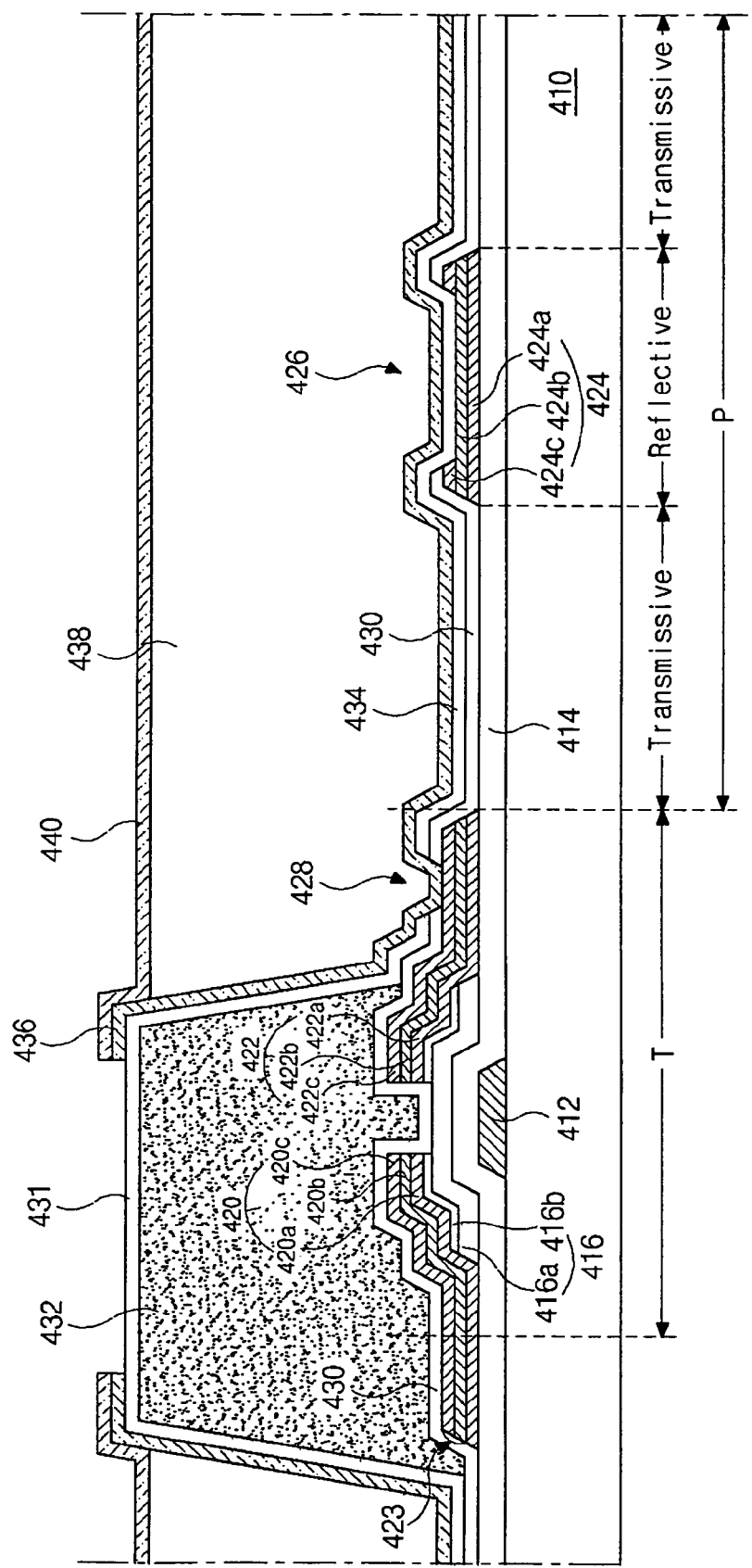
FIG. 6 is a cross sectional view of another exemplary transflective liquid crystal display device having a color filter-on-thin film transistor structure according to a the present invention.

FIG. 6 is a cross sectional view of another exemplary transflective liquid crystal display device having a color filter-on-thin film transistor structure according to the present invention. In FIG. 6, a gate electrode 412 may be formed on a substrate 410, and a gate insulating layer 414 may be formed on the substrate 410 to cover the gate electrode 412. In addition, a semiconductor layer 416 may be disposed on the gate insulating layer 414, especially covering the gate electrode 412, and may include a first layer 416a of intrinsic amorphous silicon and a second layer 416b of extrinsic amorphous silicon. The first silicon layer 416a may be referred to as an active layer, and a second silicon layer 416b may be referred to as an ohmic contact layer.

Next, source and drain electrodes 420 and 422 may be formed on the semiconductor layer 416, and a data line 423 may be formed on the gate insulating layer 414 to be connected with the source electrode 420. Then, a reflector 424 may be formed on the gate insulating layer 414 within the pixel region P, and may be spaced apart from the drain electrode 422. Accordingly, an area where the reflector 424 may be disposed may be defined as a reflective portion. The source electrode 420, the drain electrode 422, the reflector 424, and the data line 423 may be formed together during the same patterning process using the same metallic materials.

In FIG. 6, each of the source electrode 420, the drain electrodes 422, and the reflector 424 may have a triple-layered structure. For example, the source electrode 420 may include a first metal layer 420a, a second metal layer 420b, and a third metal layer 420c, and the drain electrode 422 may include a first metal layer 422a, a second metal layer 422b, and a third metal layer 422c. Similarly, the reflector 424 may include a first metal layer 424a, a second metal layer 424b, and a third metal layer 424c. The first and third metal layers 420a, 422a, 424a, 420c, 422c, and 424c may include metallic material having an excellent chemical resistance, such as molybdenum (Mo). The second metal layers 420b, 422b, and 424b may include metallic material having low electrical resistance, such as aluminum (Al). Thus, each of the source electrode 420, the drain electrodes 422, and the reflector 424 may include the triple-layered structure of Mo—Al—Mo. The first metal layers 420a, 422a, and 424a of molybdenum (Mo) may be formed to prevent spike phenomenon during formation of the second metal layers 420b, 422b, and 424b of aluminum, thereby protecting the underlying semiconductor layer 416. The third metal layers 420c, 422c, and 424c of molybdenum (Mo) may be formed to prevent electrochemical reaction between the second metal layers of aluminum and a later formed transparent conductive material, such as indium tin oxide (ITO). When forming the source electrode 420, the drain electrode 422, and the reflector 424, first molybdenum (Mo), aluminum (Al) and second molybdenum (Mo) may be sequentially deposited and then simultaneously patterned to form the Mo—Al—Mo triple-layered structure. Next, an exposed portion of the ohmic contact layer 416b may be removed to expose a portion of the active layer 416a between the source and drain electrodes 420 and 422, thereby forming a channel on the active layer 416a. Accordingly, the gate electrode 412, the semiconductor layer 416, and the source and drain electrodes 418 and 420 may constitute a thin film transistor T.

In FIG. 6, a first passivation layer 430 may be formed on the gate insulating layer 414 over an entire surface of the substrate 410 to cover the thin film transistor T and the triple-layered reflector 424. Then, a portion of the first passivation layer 430, which is on the reflector 424, may be removed to form an opening 426 to expose the third metal layer 424c of the reflector 424, and the exposed portion of the third metal layer 424c may be removed to expose the underlying second metal layer 424b. Accordingly, the second metal for the second metal layer 424b, such as aluminum (Al), has a better reflectivity than the third metal for the third metal layer 424c, such as molybdenum (Mo). The process of forming the opening 426 may be performed at the same time as forming a drain contact hole 428 that exposes a portion of the drain electrode 422 through the first passivation layer 430. The first passivation layer 430 and the third metal layer 424c may be simultaneously patterned throughout the same dry etching process. Thus, an additional process of removing the third metal layer 424c may not be necessary.

Next, a black matrix 432 may be formed on the first passivation layer 430, especially covering the data line 423 and the thin film transistor T, except for a portion of the drain electrode 422. Then, a second passivation layer 434 may be disposed on the first passivation layer 432 to cover the black matrix 432, wherein the first and second passivation layers 430 and 434 together may have the drain contact hole 428 that exposes a portion of the drain electrode 422. Next, a first transparent electrode 436 may be formed on the second passivation layer 434 within the pixel region P to contact the drain electrode 422 through the drain contact hole 428, and may overlap a portion of the black matrix 432. Although not shown, the black matrix 432 may be disposed to correspond to a gate electrode (not shown) so that it defines the pixel region P where a color filter is disposed, wherein the black matrix 432 may function as a border of neighboring color filters. A color filter 438 having red, green, or blue colors may be formed on the first transparent electrode 436 within the pixel region P, and a second transparent electrode 440 may be formed on color filter 438 to contact the first transparent electrode 436 so that the second transparent electrode 440 may completely cover the color filter 438. Since the second transparent electrode 440 may contact the first transparent electrode 436, the second transparent electrode 440 may electrically communicate with the thin film transistor T throughout the first transparent electrode 436. Accordingly, the first and second transparent electrodes 436 and 440 may constitute a pixel electrode that may be referred to as a sandwich pixel electrode since the color filter 438 may be interposed between the first and second transparent electrodes 436 and 440. Thus, the pixel region P may be divided into the reflection portion where the reflector 424 is formed and the transmissive portion where the other transparent layers are formed.

Figure 7A:
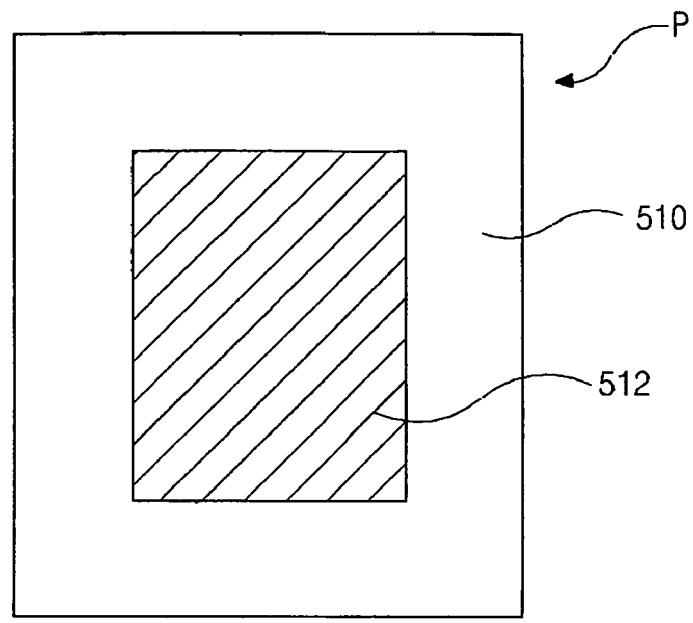
FIGS. 7A to 7K are plan views of exemplary reflective and transmissive portions within a pixel region of a transflective liquid crystal display device according to the present invention.

FIGS. 7A to 7K are plan views of exemplary reflective and transmissive portions within a pixel region of a transflective liquid crystal display device according to the present invention. In FIG. 7A, a pixel region P may include a reflective portion 512 and a transmissive portion 510, wherein the reflective portion 512 may have a rectangular shape and may be disposed within a central portion of a transmissive portion 510. In addition, diagonal lines of the transmissive portion 510 may exactly correspond to diagonal lines of the reflective portion 512.

Figure 7B:
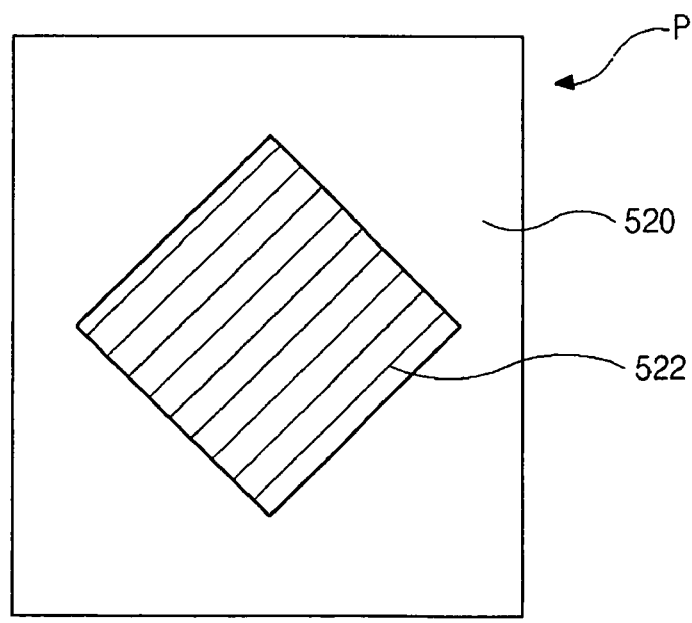

In FIG. 7B, a reflective portion 522 may be disposed within a central portion of a transmissive portion 520, similar to the reflective portion 512 of FIG. 7A. However, the reflective portion 522 may have one of a rhombic shape and a diamond shape. In addition, the diagonal lines of the transmissive portion 520 may cross the diagonal lines of the reflective portion 522.

Figure 7C:
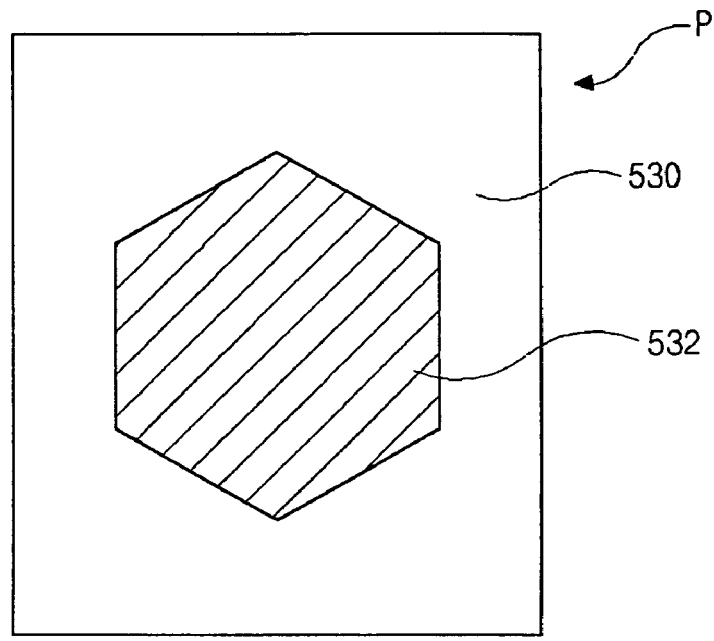

In FIG. 7C, a reflective portion 532 may be disposed within a central part of a transmissive portion 530, and may be surrounded by the transmissive portion 530. The reflective portion 532 may have a hexagonal shape.

Figure 7D:
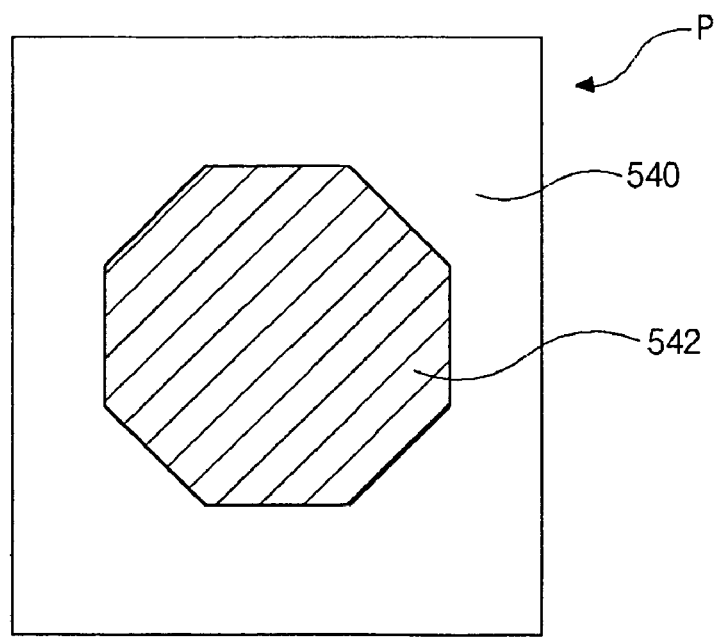

In FIG. 7D, a reflective portion 542 may be disposed within a central part of a transmissive portion 540, and may be surrounded by the transmissive potion 540. The reflective portion 542 may have an octagonal shape.

Figure 7E:
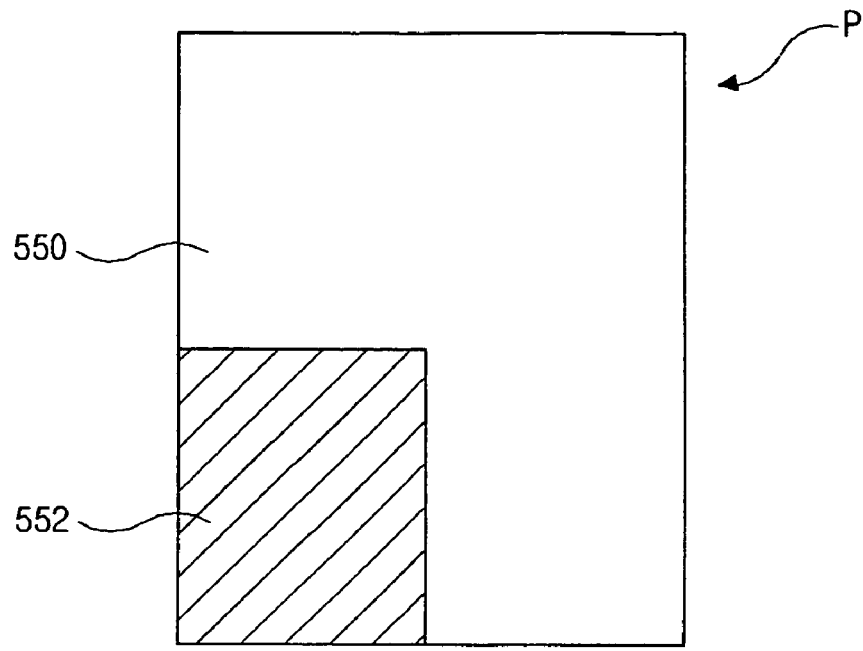
Figure 7F:
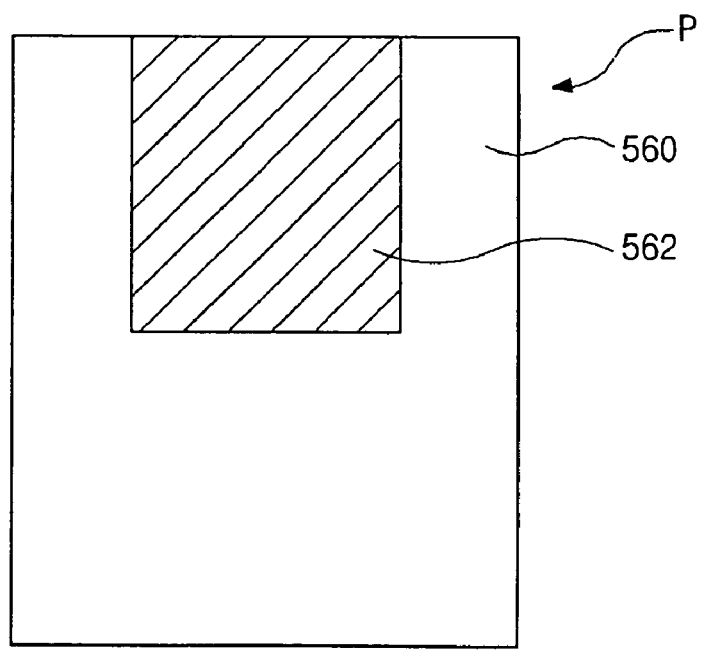

FIGS. 7E and 7F show exemplary modifications and variations of the reflective portion of FIG. 7A. In FIGS. 7E and 7F, reflective portions 552 and 562 may have rectangular shapes, but may be disposed in different locations. In FIG. 7E, the reflective portion 552 may be disposed at one corner of a transmissive portion 550 so that two sides of the reflective portion 552 correspond to and contact two sides of the transmissive portion 550. In FIG. 7F, the reflective portion 562 may be disposed at one side of a transmissive portion 560 so that one side of the reflective portion 562 corresponds to and contacts one side of the transmissive portion 560. In addition, two sides of the rectangular-shaped reflective portion 552 may border on the transmissive portion 550, as shown in FIG. 7E, and three sides of the rectangular-shaped reflective portion 562 may border on the transmissive portion 560, as shown in FIG. 7F.

Figure 7G:
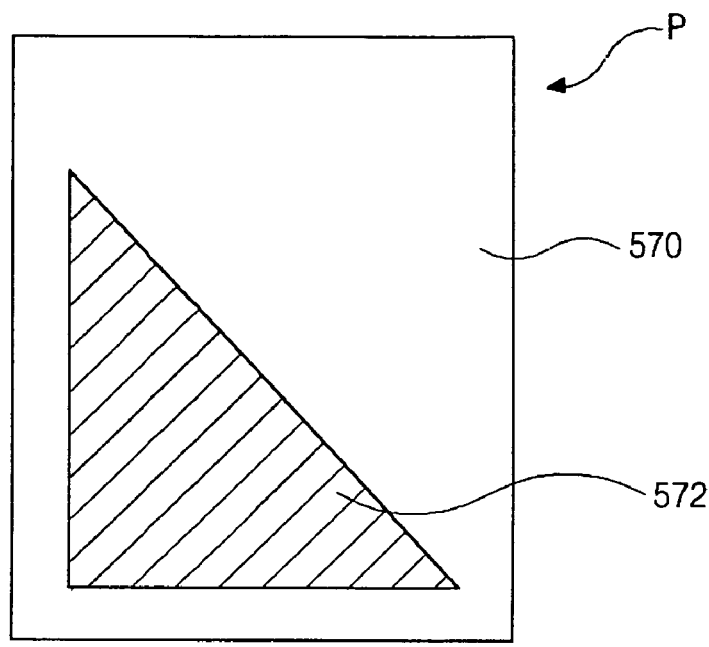
Figure 7H:
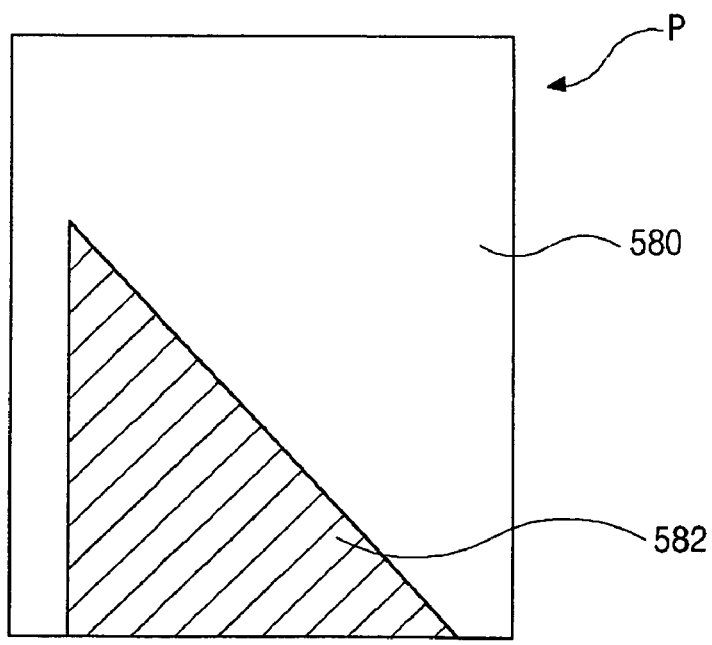
Figure 7I:
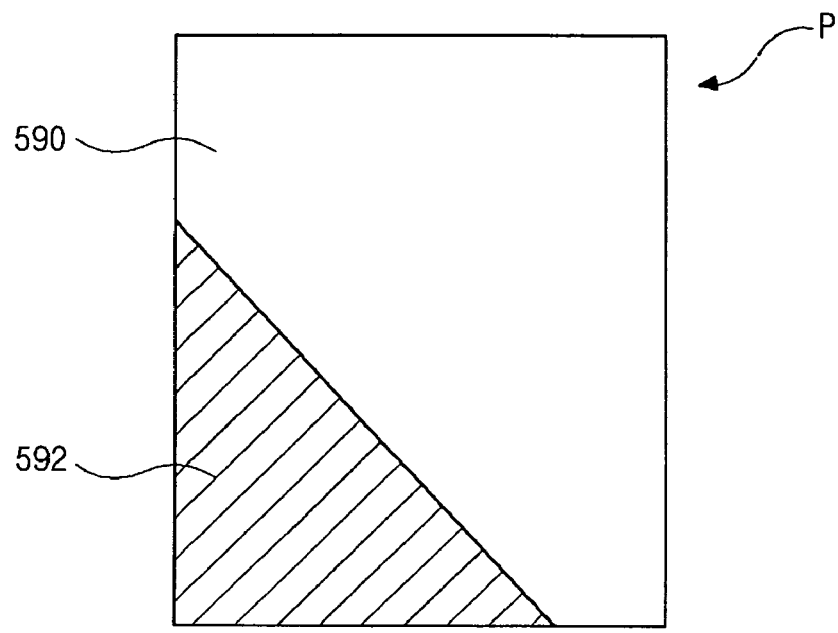

FIGS. 7G to 7I show exemplary reflective portions having right-angled triangular shapes. In FIG. 7G, a reflective portion 572 may be disposed inside of a transmissive portion 570, wherein all sides of the reflective portion 572 may be surrounded by the transmissive portion 570. Accordingly, two sides of the right-angled triangular reflective portion 572 may correspond to two sides of the rectangular transmissive portion 570, but do not contact them.

In FIG. 7H, one side of a reflective portion 582 may be shaped like a right-angled triangle that contacts one side of a transmissive portion 580. However, only one side and the hypotenuse of the right-angled triangular reflective portion 582 may be surrounded by and border on the transmissive portion 580.

In FIG. 7I, a right-angled triangular reflective portion 592 may be disposed at one corner of a rectangular transmissive portion 590 such that two sides of the right-angled triangular reflective portion 592 may contact two sides of the transmissive portion 590. Accordingly, only the hypotenuse of the right-angled triangular reflective portion 582 may border on the transmissive portion 590.

Figure 7J:
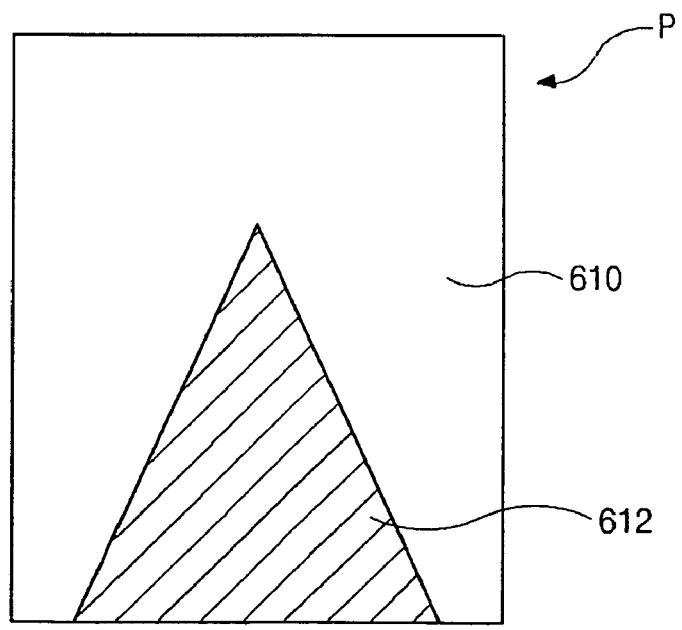
Figure 7K:
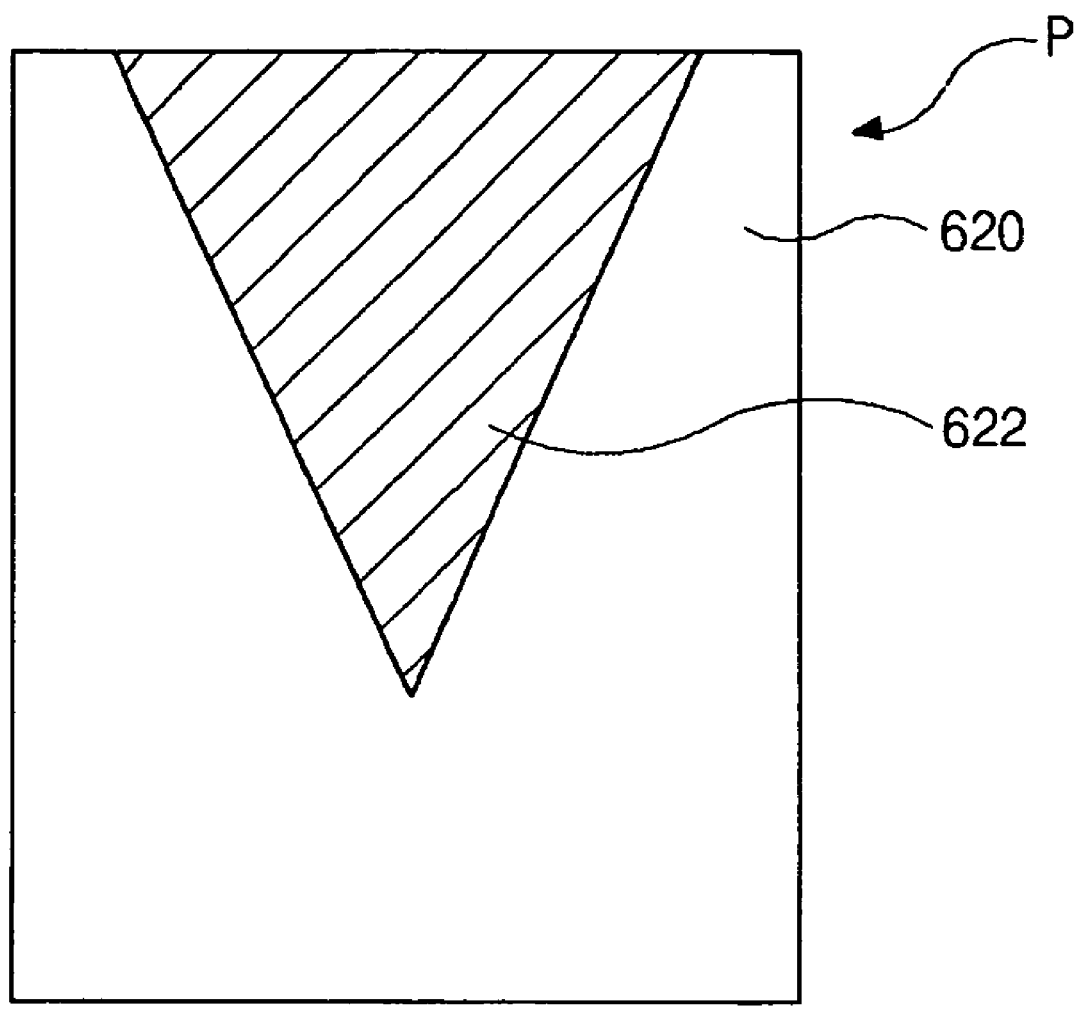

FIGS. 7J and 7K show exemplary reflective portions having isosceles triangular shapes. In FIG. 7J, a bottom side of an isosceles triangular reflective portion 612 may correspond to and contact a bottom side of a rectangular transmissive portion 610, and the other two equal sides of the isosceles triangular reflective portion 612 may border on the transmissive portion 610. In FIG. 7K, a bottom side of an isosceles triangular reflective portion 622 may correspond to and contact a top side of a rectangular transmissive portion 620, and the other two equal sides of the isosceles triangular reflective portion 622 may border on the transmissive portion 620.

Figure 8:
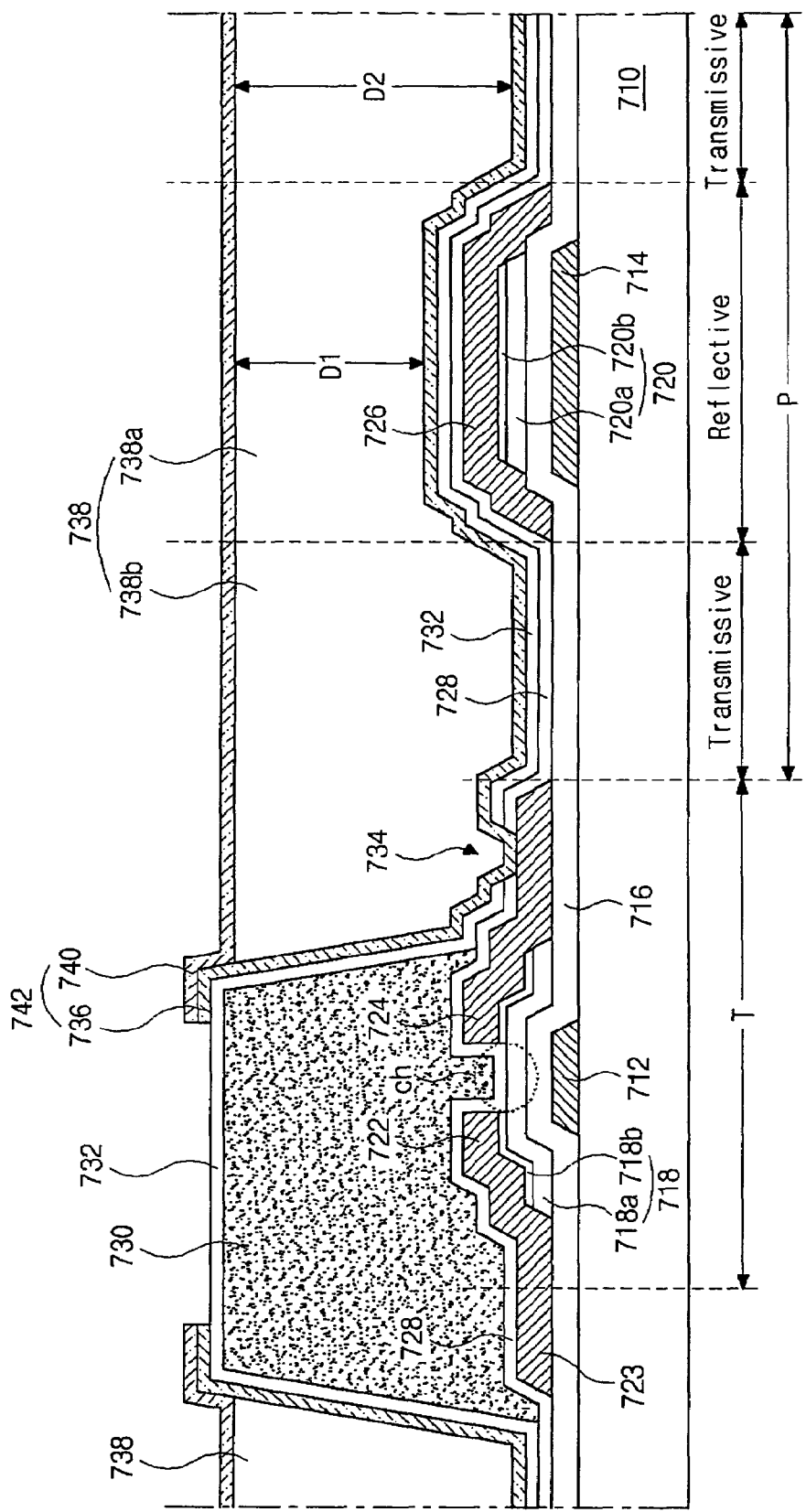
FIG. 8 is a cross sectional view of an exemplary transflective liquid crystal device having a color filter-on-thin film transistor structure and buffer patterns according to the present invention.

FIG. 8 is a cross sectional view of an exemplary transflective liquid crystal device having a color filter-on-thin film transistor structure and buffer patterns according to the present invention. In FIG. 8, a gate electrode 712 may be formed on a substrate 710, and a first buffer pattern 714 may be formed on the substrate 710 within a pixel region P. Accordingly, the first buffer pattern 714 may be spaced apart from the gate electrode 712, and may be disposed within the pixel region P within a reflective portion where a reflector may be formed. The gate electrode 712 and the first buffer pattern 714 may be formed together during the same process step using the same material. In addition, a gate insulating layer 716 may be formed on the substrate 710 to cover the gate electrode 712 and the first buffer pattern 714.

Next, a semiconductor layer 718 may be disposed on the gate insulating layer 716 to cover the gate electrode 712, and a second buffer pattern 720 may be disposed on the gate insulating layer 716 directly above the first buffer pattern 714. Accordingly, the semiconductor layer 718 and the second buffer pattern 720 may be formed together during the same process step using the same material. For example, the semiconductor layer 718 may sequentially include a first layer 718a of intrinsic amorphous silicon and a second layer 718b of extrinsic amorphous silicon. Similarly, the second buffer pattern 720 may sequentially include a first layer 720a of intrinsic amorphous silicon and a second layer 720b of extrinsic amorphous silicon. Accordingly, the first layer 718a may be referred to as an active layer, and a second layer 718b may be referred to as an ohmic contact layer.

Then, source and drain electrodes 722 and 724 may be formed on the semiconductor layer 718, and a data line 723 may be formed on the gate insulating layer 716 to be connected to the source electrode 722. Next, a reflector 726 may be disposed on the second buffer pattern 720 within the reflective portion of the pixel region P, and may be spaced apart from the drain electrode 724. Accordingly, an area where the reflector 726 may be disposed may be defined as the reflective portion. The source electrode 722, the drain electrode 724, the data line 723, and the reflector 726 are formed together during the same patterning process using the same metallic material. Next, an exposed portion of the ohmic contact layer 718b between the source and drain electrodes 722 and 724 may be removed to expose a portion of the active layer 718a, thereby forming a channel ch on the active layer 718a. Thus, the gate electrode 712, the semiconductor layer 718, and the source and drain electrodes 722 and 724 may constitute a thin film transistor T.

Next, a first passivation layer 728 may be formed on the gate insulating layer 716 over an entire surface of the substrate 710 to cover the thin film transistor T and the reflector 726. Then, a black matrix 730 may be formed on the first passivation layer 728, especially covering the data line 723 and the thin film transistor T, except for a portion of the drain electrode 724, and a second passivation layer 732 may be disposed on the first passivation layer 728 to cover the black matrix 730. In addition, the first and second passivation layers 728 and 732 may have a drain contact hole 734 that exposes a portion of the drain electrode 724. Next, a first transparent electrode 736 may be formed on the second passivation layer 732 within the pixel region P to contact the drain electrode 724 through the drain contact hole 734, and may overlap a portion of the black matrix 730. Although not shown, the black matrix 730 may be disposed to correspond to a gate electrode (not shown) so that it defines the pixel region P where a color filter is disposed, wherein the black matrix 730 may function as a border of neighboring color filters. Then, a color filter 738 having red, green, or blue colors may be formed on the first transparent electrode 736 within the pixel region P. Next, a second transparent electrode 740 may be formed on color filter 738 to contact the first transparent electrode 736 so that the second transparent electrode 740 may completely cover the color filter 738. Since the second transparent electrode 740 may contact the first transparent electrode 736, it may electrically communicate with the thin film transistor T. Accordingly, the first and second transparent electrodes 736 and 740 may constitute a pixel electrode 742 referred to as a sandwich pixel electrode since the color filter 738 may be interposed between the first and second transparent electrodes 736 and 740.

In FIG. 8, the pixel region P may be divided into the reflection portion where the reflector 726 is disposed and the transmissive portion where the other transparent layers are formed. The color filter 738 may include a first portion 738a that is disposed corresponding to the reflective portion and a second portion 738b that is disposed corresponding to the transmissive portion, wherein the first portion 738a may have a first thickness D1 and the second portion 738b may have a second thickness D2. Since the first and second buffer patterns 714 and 720 may be disposed within the reflective portion under the reflector 726, the first thickness D1 may be less than the second thickness D2. For example, the first color filter portion 738a within the reflective portion may be thinner than the second color filter portion 738b in the transmissive portion by as much as the thickness of the first and second buffer patterns 714 and 720. Thus, it may be possible to minimize light path differences between the reflective mode and the transmissive mode. As a result, the color reproduction of the first color filter portion 738a is about equal to that of the second color filter portion 738b. In addition, light paths of ambient and artificial light may be similar.

Figure 9:
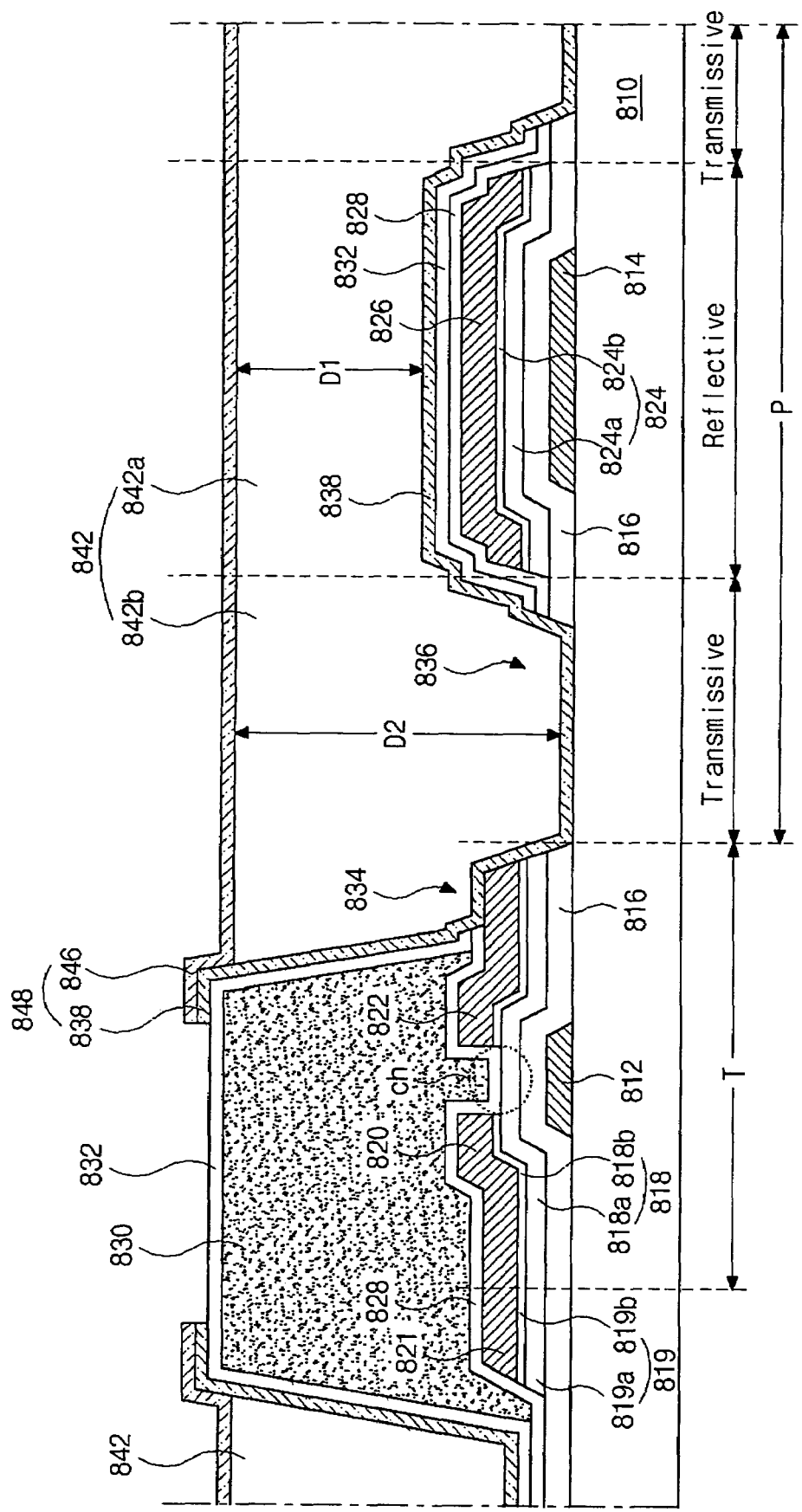
FIG. 9 is a cross sectional view of another exemplary transflective liquid crystal device having a color filter-on-thin film transistor structure and buffer patterns according to the present invention.

FIG. 9 is a cross sectional view of another exemplary transflective liquid crystal device having a color filter-on-thin film transistor structure and buffer patterns according to the present invention. In FIG. 9, a gate electrode 812 may be formed on a substrate 810, and a first buffer pattern 814 may be formed on the substrate 810 within a pixel region P. The first buffer pattern 814 may be spaced apart from the gate electrode 812, and may be disposed within the pixel region P in a reflective portion where a reflector may be formed. The gate electrode 812 and the first buffer pattern 814 may be formed together during the same process step using the same material. In addition, a gate insulating layer 816 may be formed on the substrate 810 to cover the gate electrode 812 and the first buffer pattern 814.

After forming the gate insulating layer 816, a pure amorphous silicon layer, an impurity-doped amorphous silicon layer, and a metal layer may be sequentially formed on the gate insulating layer 816. Then, they may be simultaneously patterned to form a semiconductor layer 818, a semiconductor pattern 819, a second buffer pattern 824, a source electrode 820, a drain electrode 822, a data line 821, and a reflector 826. The semiconductor layer 818 may be formed on the gate insulating layer 816, especially covering the gate electrode 812, and the second buffer pattern 824 may be formed on the gate insulating layer 816, especially directly above the first buffer pattern 814. The semiconductor pattern 819 may extend from the semiconductor layer 818 and may be formed on the gate insulation layer 816, especially directly beneath the data line 821. The source and drain electrodes 820 and 822 may be formed on the semiconductor layer 818, and the data line 821 on the semiconductor pattern 819 may be connected to the source electrode 820 and may have the same pattern shape as the semiconductor pattern 819. The reflector 826 may be formed on the second buffer pattern 824 and may have the same pattern shape as the second buffer pattern 824. The semiconductor layer 818 may include a sequential arrangement of a first layer 818a of intrinsic amorphous silicon and a second layer 818b of extrinsic amorphous silicon. The semiconductor pattern 819b may include a sequential arrangement of a first layer 819a of intrinsic amorphous silicon and a second layer 819 of extrinsic amorphous silicon. The second buffer pattern 824 may include a sequential arrangement of a first layer 824a of intrinsic amorphous silicon and a second layer 824b of extrinsic amorphous silicon. The first layer 818a of the semiconductor layer 818 may be referred to as an active layer, and a second layer 818b of the semiconductor layer 818 may be referred to as an ohmic contact layer. Accordingly, an area where the reflector 826 may be disposed may be defined as the reflective portion, and the source electrode 820, the drain electrode 822, the data line 821, and the reflector 826 may be formed of the same metallic material. Then, an exposed portion of the ohmic contact layer 818b between the source and drain electrodes 820 and 822 may be removed to expose a portion of the active layer 818a, thereby forming a channel ch on the active layer 818a. Accordingly, the source and drain electrodes 820 and 822 may have the same pattern shape as the underlying semiconductor layer 818, except for the channel portion ch. Thus, the gate electrode 812, the semiconductor layer 818, and the source and drain electrodes 820 and 822 may constitute a thin film transistor T.

In FIG. 9, a first passivation layer 828 may be formed on the gate insulating layer 816 over an entire surface of the substrate 810 to cover the thin film transistor T and the reflector 826. Then, a black matrix 830 may be formed on the first passivation layer 828, especially covering the data line 821 and the thin film transistor T, except for an edge portion of the drain electrode 724, and a second passivation layer 832 may be disposed on the first passivation layer 828 to cover the black matrix 830. Then, the first and second passivation layer 828 and 832 may be simultaneously patterned to form a first opening 834 and a second opening 836. The first opening 834 may expose the edge portion of the drain electrode 822, and the second opening 836 may expose the substrate 810 in the transmissive portion of the pixel region P where the reflector 826 is not disposed.

Next, a first transparent electrode 838 may be formed within the pixel region P to contact the edge portion of the drain electrode 822 through the first opening 834, and may overlap a portion of the black matrix 830. Although not shown, the black matrix 830 may be disposed to correspond to a gate electrode (not shown) so that it defines the pixel region P where a color filter is disposed, wherein the black matrix 830 may function as a border of neighboring color filters. Next, a color filter 842 having red, green, or blue colors may be formed on the first transparent electrode 838 within the pixel region P. Then, a second transparent electrode 846 may be formed on color filter 842 to contact the first transparent electrode 838 so that the second transparent electrode 846 may completely cover the color filter 842. Since the second transparent electrode 846 may contact the first transparent electrode 838, it may electrically communicate with the thin film transistor T. Accordingly, the first and second transparent electrodes 838 and 846 may constitute a pixel electrode 848 that may be referred to as a sandwich pixel electrode since the color filter 842 may be interposed between the first and second transparent electrodes 838 and 846.

Accordingly, the pixel region P may be divided into the reflection portion where the reflector 826 and the buffer patterns 814 and 824 are disposed and the transmissive portion where the reflector 826 and the buffer patterns 814 are not formed. The color filter 842 may include a first portion 842a that may correspond to the reflective portion and a second portion 842b that may correspond to the transmissive portion. In addition, the first portion 842a may have a first thickness D1 and the second portion 842b may have a second thickness D2. Since the first and second buffer patterns 814 and 824 and the patterned insulators 816, 828, and 832 may be disposed in the reflective portion, the first thickness D1 may be less than the second thickness D2. For example, the first color filter portion 842*a* in the reflective portion may be thinner than the second color filter portion 842*b* in the transmissive portion by as much as the thickness of the first and second buffer patterns 714 and 720 and the patterned insulators 816, 828, and 832. Furthermore, since the gate insulating layer 816 and the first and second passivation layers 828 and 832 may be removed from the transmissive portion, the second thickness D2 may be significantly larger than the second thickness D2 in FIG. 8. Accordingly, it may be possible to minimize light path differences in the reflective mode and in the transmissive mode. Thus, light paths of ambient and artificial light may be the same to each.

FIGS. 10A to 10E are cross sectional views of another exemplary transflective LCD devices each having a color filter-on-thin film transistor structure and buffer patterns according to the present invention. In FIGS. 10A to 10E, each exemplary transflective LCD device may have the thin film transistor, the buffer patterns, and the reflector as those of FIG. 9. Thus, the detailed descriptions for those elements are omitted.

In FIG. 10A, a thin film transistor T may be formed on a substrate 910, and buffer patterns and a reflector 926 may be formed on and over the substrate 910 in a reflective portion of a pixel region P. Then, a passivation layer 938 may be formed on the thin film transistor T to cover the thin film transistor T, except for a portion of a drain electrode 922. In addition, the passivation layer 938 may be formed in the reflective portion to cover the reflector 926. Accordingly, a gate insulating layer 916 and the passivation layer 938 may not exist in a transmissive portion of the pixel region P, but the gate insulating layer 916 and the passivation layer 938 may be disposed in the thin film transistor T and in the reflective portion. For example, the gate insulating layer 916 and the passivation layer 938 may have an opening 936 that exposes an edge of the drain electrode 922 and exposes the substrate 910 in the transmissive portion of the pixel region P.

Next, a color filter 942 may be disposed over an entire surface of the substrate 910 and may have a drain contact hole 940, wherein the color filter 942 may have one of red, green, and blue colors in each pixel region P. Then, a transparent pixel electrode 944, which may contact the drain electrode 922 through the drain contact hole 940, may be formed on the color filter 942, and a black matrix 946 may be formed above the color filter 942 to cover the thin film transistor T. Although not shown, the black matrix 946 may also cover data and gate lines (not shown).

In contrast to the exemplary transflective LCD device of FIG. 9, the exemplary transflective LCD device of FIG. 10A may not include an additional passivation layer and an additional transparent electrode. Accordingly, the exemplary transflective LCD device of FIG. 10A may be fabricated through a simplified fabrication process.

Figure 10B:
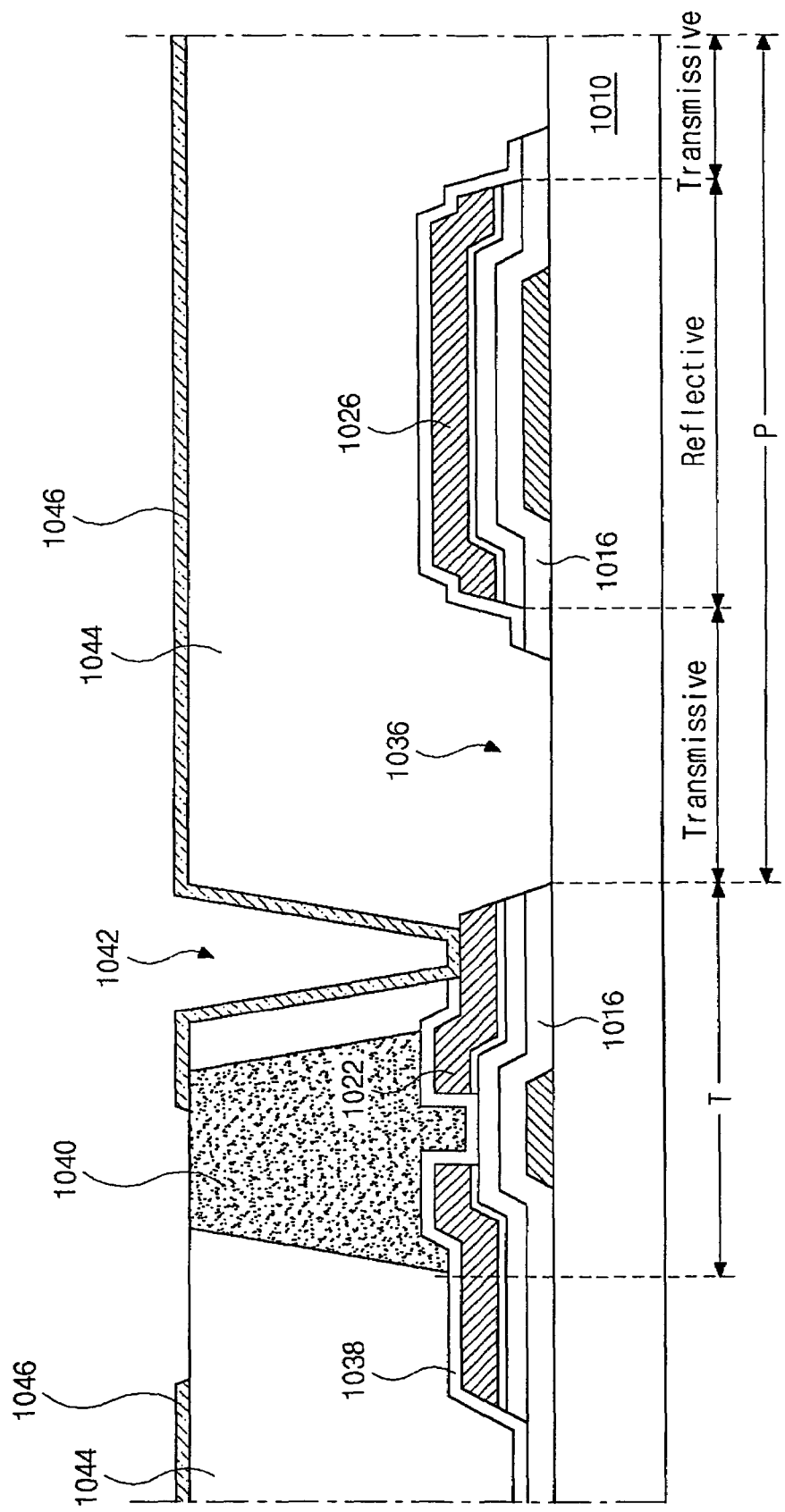

In FIG. 10B, a thin film transistor T may be formed on a substrate 1010, and buffer patterns and a reflector 1026 may be formed on and over the substrate 1010 especially within a reflective portion of a pixel region P. Then, a passivation layer 1038 may be formed on the thin film transistor T to cover the thin film transistor T, except for an edge portion of a drain electrode 1022. In addition, the passivation layer 1038 may be formed in the reflective portion to cover the reflector 1026. Although a gate insulating layer 1016 and the passivation layer 1038 may not exist in a transmissive portion of the pixel region P, the gate insulating layer 1016 and the passivation layer 1038 may be disposed in the thin film transistor T and in the reflective portion. For example, the gate insulating layer 1012 and the passivation layer 1038 may have an opening 1036 that exposes an edge of the drain electrode 1022 and exposes the substrate 1010 in the transmissive portion of the pixel region P.

Next, a black matrix 1040 may be formed on the passivation layer 1038, especially above the thin film transistor T. Although not shown, the black matrix 1040 may correspond to positions of the data and gate lines (not shown) so that it defines the pixel region P where a color filter is disposed, wherein the black matrix 1040 may function as a border of neighboring color filters. Next, a color filter 1044 may be disposed over an entire surface of the substrate 1010, except for the black matrix 1040, and may have a drain contact hole 1042. The color filter 1044 may have one of red, green, and blue colors within each pixel region P. Then, a transparent pixel electrode 1046, which may contact the drain electrode 1022 through the drain contact hole 1042, may be formed on the color filter 1044, wherein the transparent pixel electrode 1046 may overlap a portion of the black matrix 1040 so that it completely covers the color filter 1044.

In FIG. 10B, since the black matrix 1040 may be formed of a material including chromium (Cr), an additional passivation layer may not be required, as compared to the exemplary transflective LCD device of FIG. 9. Moreover, since the color filter 1044 may have the drain contact hole 1042 therein, the transparent pixel electrode 1046 may directly contact the drain electrode through the drain contact hole 1042. Accordingly, an additional transparent electrode may not be necessary, as compared to the exemplary transflective LCD device of FIG. 9. Thus, manufacturing process of the exemplary transflective LCD device of FIG. 10B may be simplified.

Figure 10C:
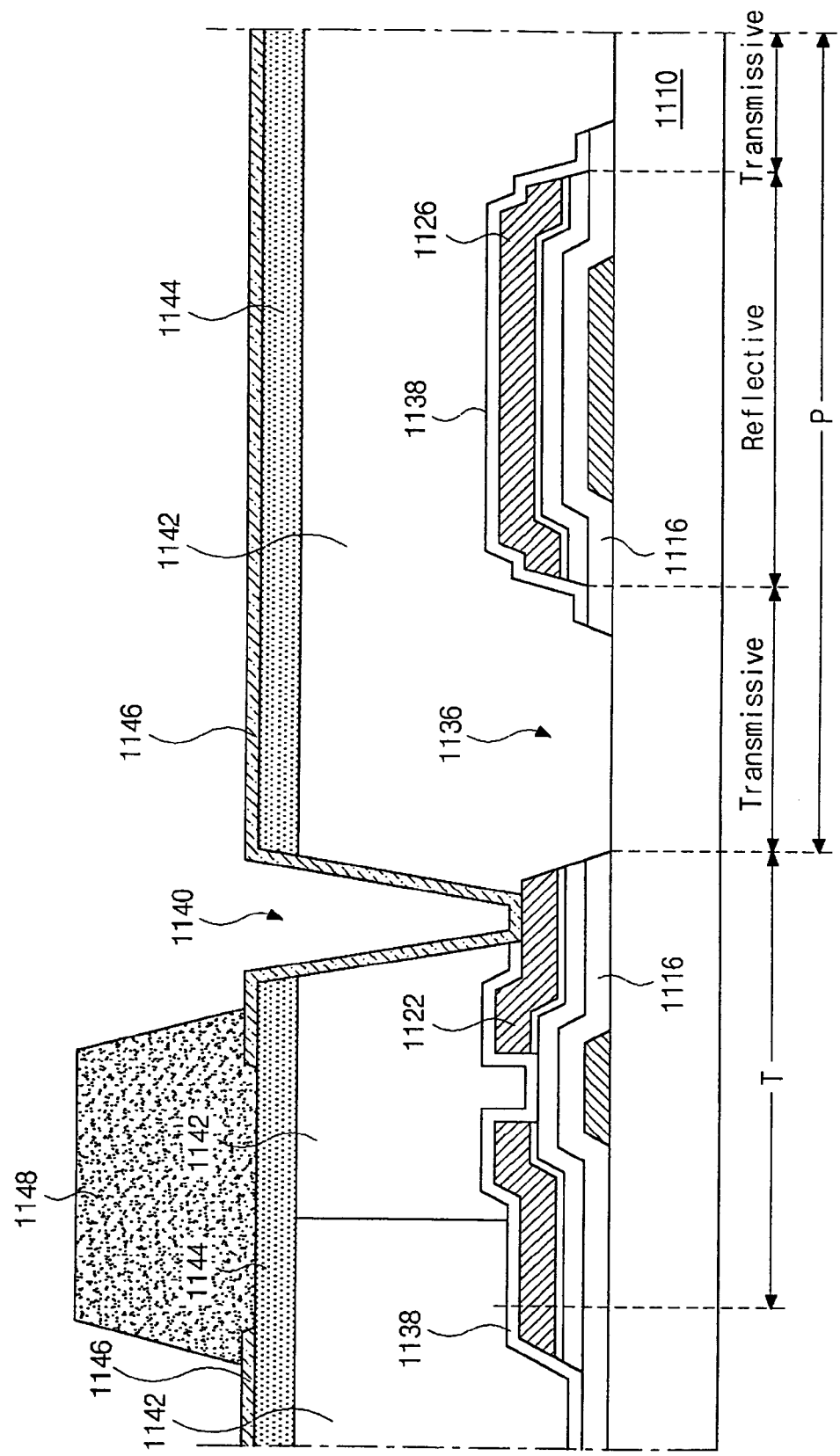

The exemplary transflective LCD device of FIG. 10C is similar to the exemplary transflective LCD device of FIG. 10A, except a planarization layer may be formed on a color filter. In FIG. 10C, a thin film transistor T may be formed on a substrate 1110, and buffer patterns and a reflector 1126 may be formed on and over the substrate 1110 in a reflective portion of a pixel region P. Next, a passivation layer 1138 may be formed on the thin film transistor T to cover the thin film transistor T, except for a portion of a drain electrode 1122. In addition, the passivation layer 1138 may be formed in the reflective portion to cover the reflector 1126. Although a gate insulating layer 1116 and the passivation layer 1138 may not exist in a transmissive portion of the pixel region P, the gate insulating layer 1116 and the passivation layer 1138 may be disposed in the thin film transistor T and in the reflective portion. For example, the gate insulating layer 1116 and the passivation layer 1138 may have an opening 1136 that exposes an edge of the drain electrode 1122 and exposes the substrate 1110 in the transmissive portion of the pixel region P.

Next, a color filter 1142 and a planarization layer 1144 may be sequentially disposed over an entire surface of the substrate 1110, and may both have a drain contact hole 1140 that exposes the edge portion of the drain electrode 1122. The color filter 1142 may have one of red, green, and blue colors in each pixel region P. Then, a transparent pixel electrode 1146, which may contact the drain electrode 1122 through the drain contact hole 1140, may be formed on the planarization layer 1144. Accordingly, the planarization layer 1144 may function to planarize the surface of the color filter 1142 and may enhance adhesion of the transparent pixel electrode 1146. Next, a black matrix 1148 may be formed above the planarization layer 1144 to cover the thin film transistor T. Although not shown, the black matrix 1148 may also cover data and gate lines (not shown).

Figure 10D:
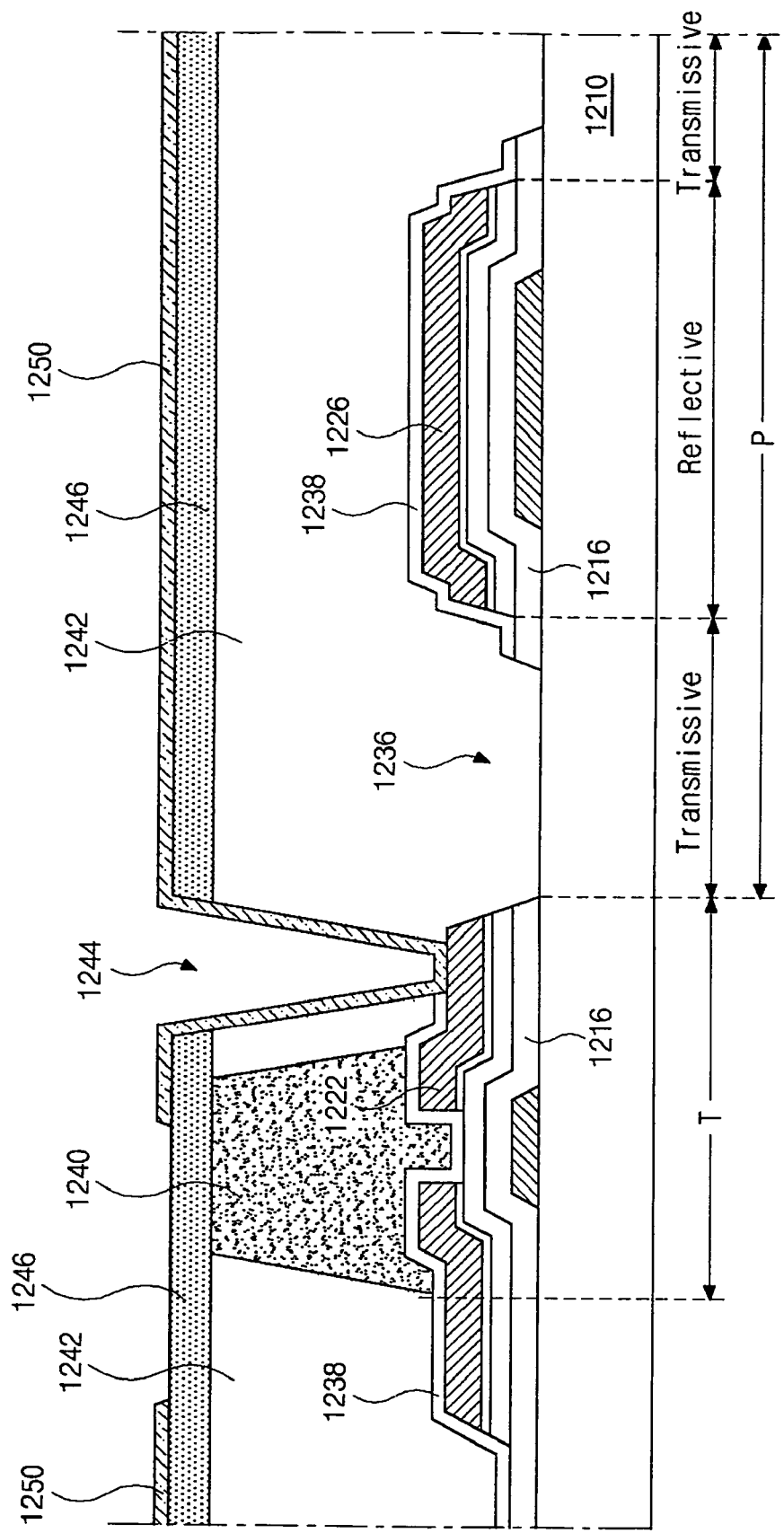

The exemplary transflective LCD device of FIG. 10D may be similar to the exemplary transflective LCD device of FIG.

10B, except a planarization layer may be formed between the color filter and a transparent pixel electrode. In FIG. 10D, a thin film transistor T may be formed on a substrate 1210, and buffer patterns and a reflector 1226 may be formed on and over the substrate 1210 within a reflective portion of a pixel region P. Next, a passivation layer 1238 may be formed on the thin film transistor T to cover the thin film transistor T, except for an edge portion of a drain electrode 1222. In addition, the passivation layer 1238 may be formed in the reflective portion to cover the reflector 1226. Although a gate insulating layer 1216 and the passivation layer 1238 may not exist in a transmissive portion of the pixel region P, the gate insulating layer 1216 and the passivation layer 1238 may be disposed within the thin film transistor T and in the reflective portion. For example, the gate insulating layer 1212 and the passivation layer 1238 may have an opening 1236 that exposes an edge of the drain electrode 1222 and exposes the substrate 1210 in the transmissive portion of the pixel region P.

Next, a black matrix 1240 may be formed on the passivation layer 1238, especially above the thin film transistor T. Although not shown, the black matrix 1240 may correspond in position to data and gate lines (not shown) so that it defines the pixel region P where a color filter is disposed, wherein the black matrix 1240 may function as a border of neighboring color filters. Next, the color filter 1242 may be disposed over an entire surface of the substrate 1210, except for the black matrix 1240, and a planarization layer 1246 may be formed over an entire surface of the substrate 1210 to cover the black matrix 1240 and the color filter 1242. In addition, the color filter 1242 and the planarization layer 1244 may have a drain contact hole 1244 that may expose the edge portion of the drain electrode 1222. The color filter 1242 may have one of red, green, and blue colors in each pixel region P. Next, a transparent pixel electrode 1250, which may contact the drain electrode 1222 through the drain contact hole 1244, may be formed on the planarization layer 1246. In addition, the transparent pixel electrode 1250 may overlap a portion of the black matrix 1240 so that it may completely cover the color filter 1242.

Figure 11A:
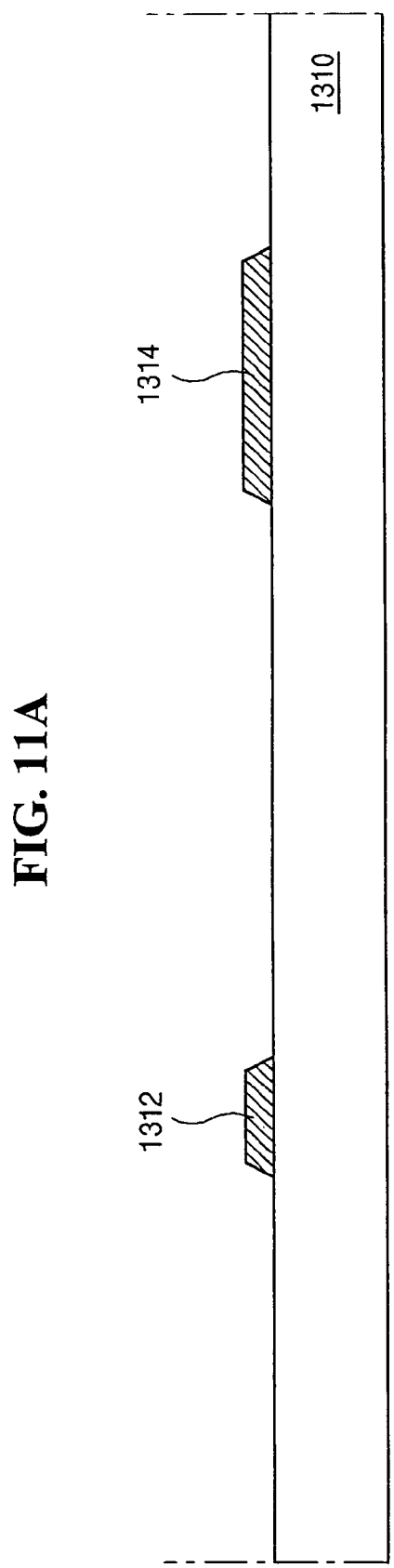
FIGS. 11A to 11H are cross sectional views of an exemplary fabrication process of a transflective liquid crystal display device according to the present invention.

FIGS. 11A to 11H are cross sectional views of an exemplary fabrication process of a transflective liquid crystal display device according to the present invention. In FIG. 11A, a first metal layer may be formed on a substrate 1310, and then patterned using a first mask process, thereby forming a gate electrode 1312 and a first buffer pattern 1314. The gate electrode 1312 and the first buffer pattern 1314 may be spaced apart from each other, and the first metal layer may include a metal having low specific resistance value, such as aluminum (Al) or an aluminum alloy.

Figure 11B:
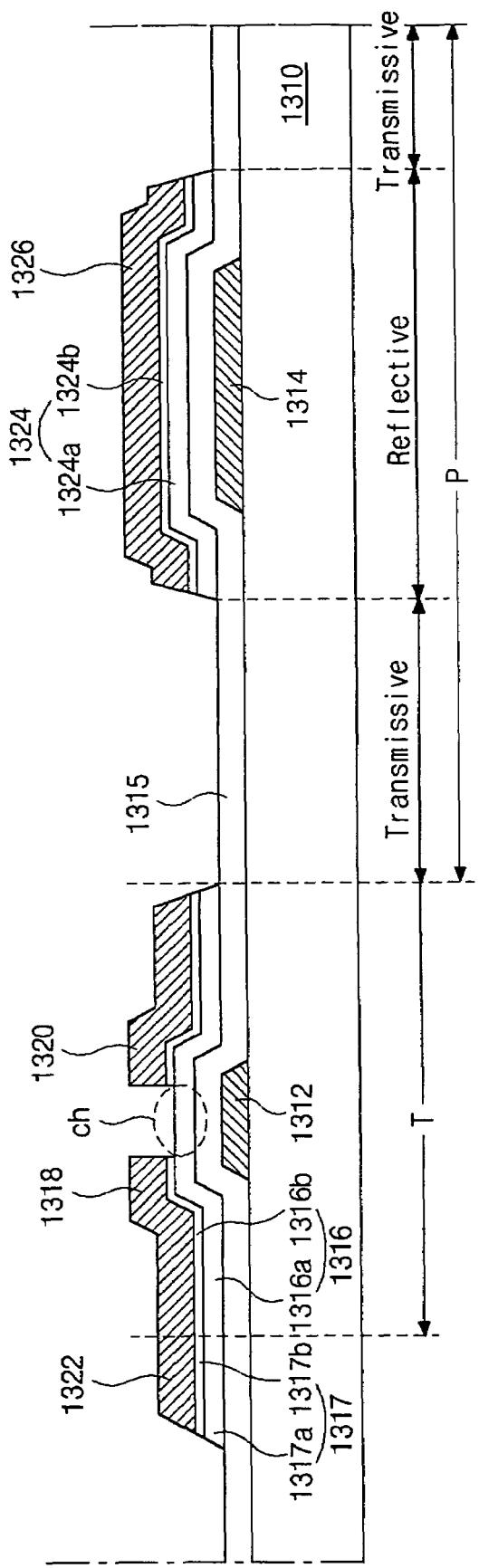

In FIG. 11B, a first insulation layer (a gate insulation layer), a pure amorphous silicon, a doped amorphous silicon, and a second metal layer may be sequentially formed over the substrate 1310 to cover the gate electrode 1312 and the first buffer pattern 1314. Then, the second metal layer, the doped amorphous silicon layer, and the pure amorphous silicon layer may be simultaneously patterned using a second mask process, thereby forming a plurality of metal patterns and a plurality of silicon patterns. During the patterning process, the first insulation layer may not be patterned, thereby forming a gate insulation layer 1315. The plurality of silicon patterns over the gate electrode 1312 may become a semiconductor layer 1316 comprising an active layer 1316a of pure amorphous silicon and an ohmic contact layer 1316b of doped amorphous silicon. The plurality of patterned silicon layers over the first buffer pattern 1314 may become a second buffer pattern 1324 having a first layer 1324a of pure amorphous silicon and a second layer 1324b of doped amorphous silicon. The patterned second metal may become a data line 1322, a source electrode 1318, a drain electrode 1320, and a reflector 1326, wherein the source and drain electrodes 1318 and 1320 may be disposed on the ohmic contact layer 1316b. In addition, the data line 1322 may extend from and may be connected to the source electrode 1318, and the reflector 1326 may be disposed on the second layer 1324b of the second buffer pattern 1324. When patterning the silicon layers and the second metal layer, a half tone mask having a half light transmitting portion, such as slits, may be adopted so that the source and drain electrodes 318 and 320 may be separated from each other. Accordingly, a portion of the ohmic contact layer 1316b between the source and drain electrodes 1318 and 1320 may be eliminated using the source and drain electrodes 1318 and 1320 as masks, thereby forming a channel (ch) on the active layer 1316a.

Meanwhile, a silicon pattern 1317 comprising a first layer 1317a of pure amorphous silicon and a second layer 1317b of doped amorphous silicon may be disposed beneath the data line 1322, and may have the same planar shape as the data line 1322. Since the second metal layer may become the reflector 1326 by way of patterning, the second metal layer may have good chemical resistance and great light reflectivity. For example, a double layer structure may include a first aluminum layer and a second metal layer may include at least one of molybdenum (Mo), tungsten (W), nickel (Ni), and titanium (Ti).

In FIG. 11B, the gate electrode 1312, the semiconductor layer 1317, the source electrode 1318, and the drain electrode 1320 may constitute a thin film transistor T. In a pixel region P that may be defined by the gate and data lines, an area including the reflector 1326 and the first and second buffer patterns 1314 and 1324 may become a reflective portion, and the rest area, except for the reflective portion that may become a transmissive portion.

Figure 11C:
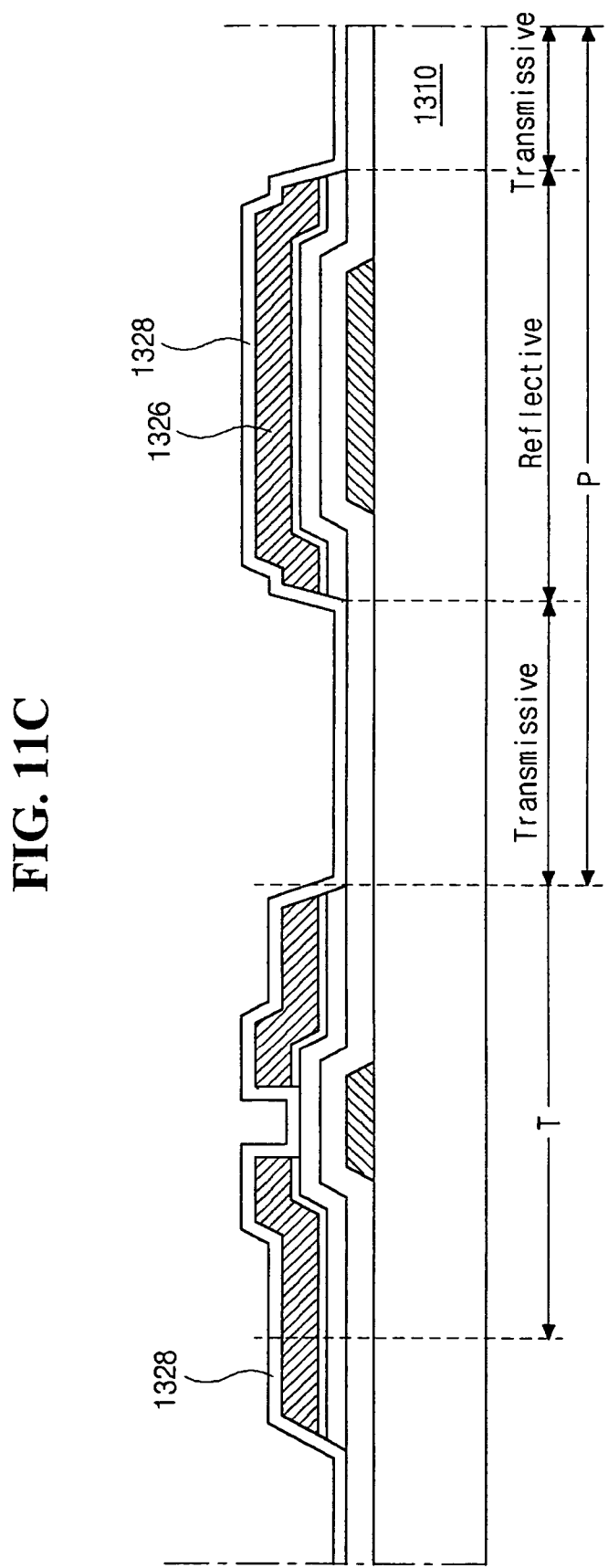

In FIG. 11C, a second insulation layer (a first passivation layer) 1328 may be formed over the entire surface of the substrate 1310 to cover the thin film transistor T and the reflector 1326.

Figure 11D:
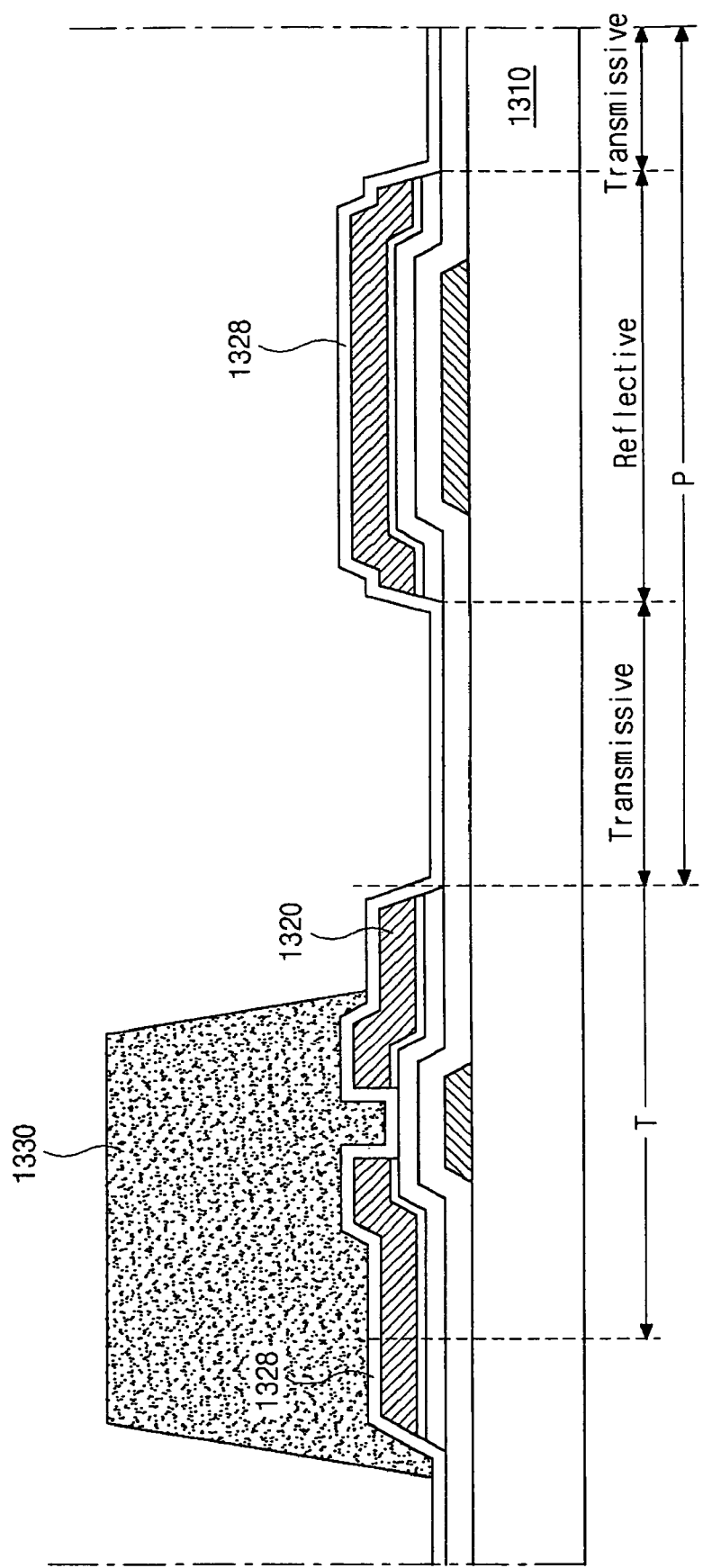

In FIG. 11D a light shielding material may be formed on the first passivation layer 1328, and then patterned using a third mask process, thereby forming a black matrix 1330 covering the thin film transistor, except for a portion of the drain electrode 1320.

Figure 11E:
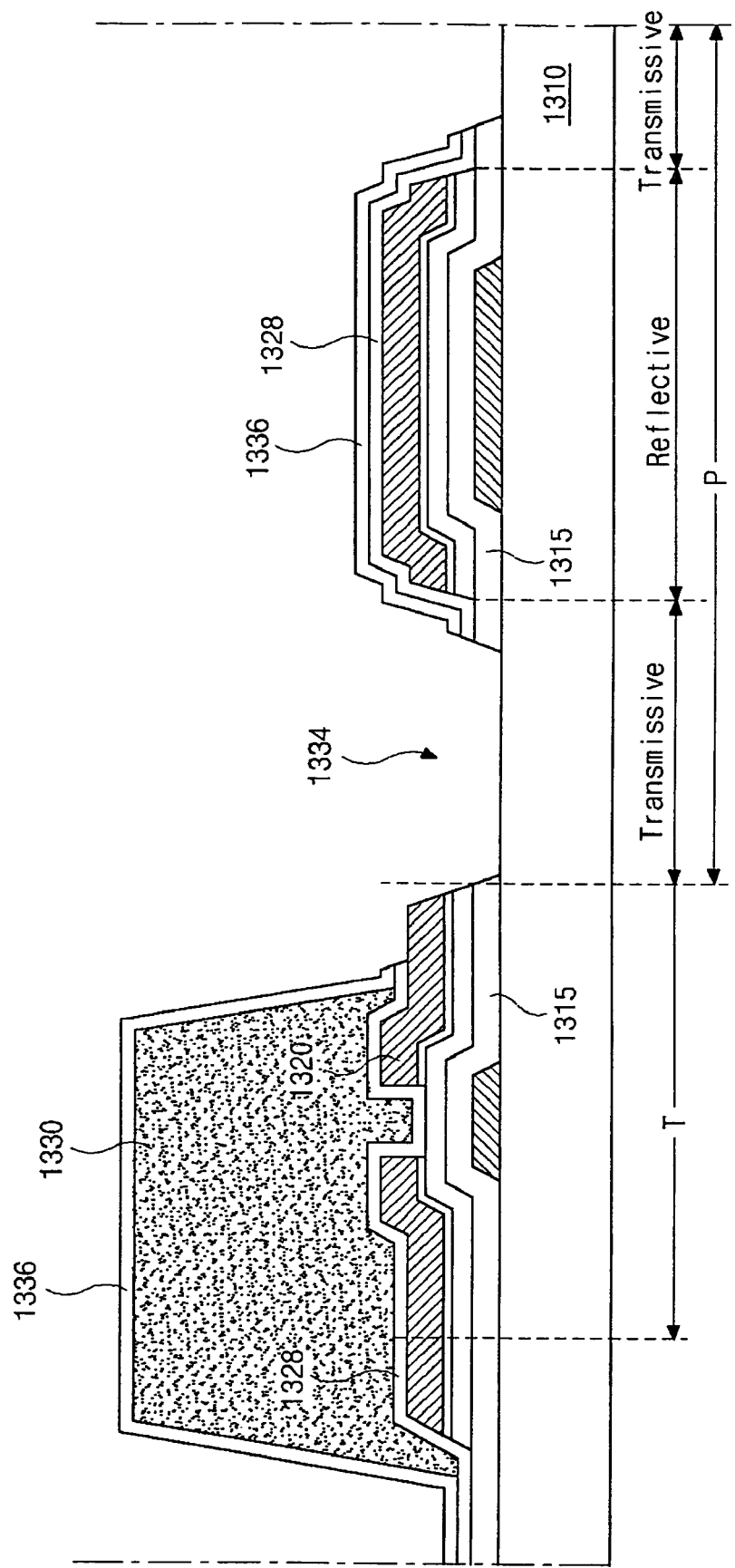

In FIG. 11E, a third insulation layer (a second passivation layer) 1336 may be formed over the entire surface of the substrate 1310 to cover the black matrix 1330. Then, the first and second passivation layers 1328 and 1336 and the gate insulation layer 1315 may be simultaneously patterned using a fourth mask process to form an opening 1334 that exposes an edge portion of the drain electrode 1320. The opening 1334 may also expose the substrate 1310 in the transmissive portion of the pixel region P.

Figure 11F:
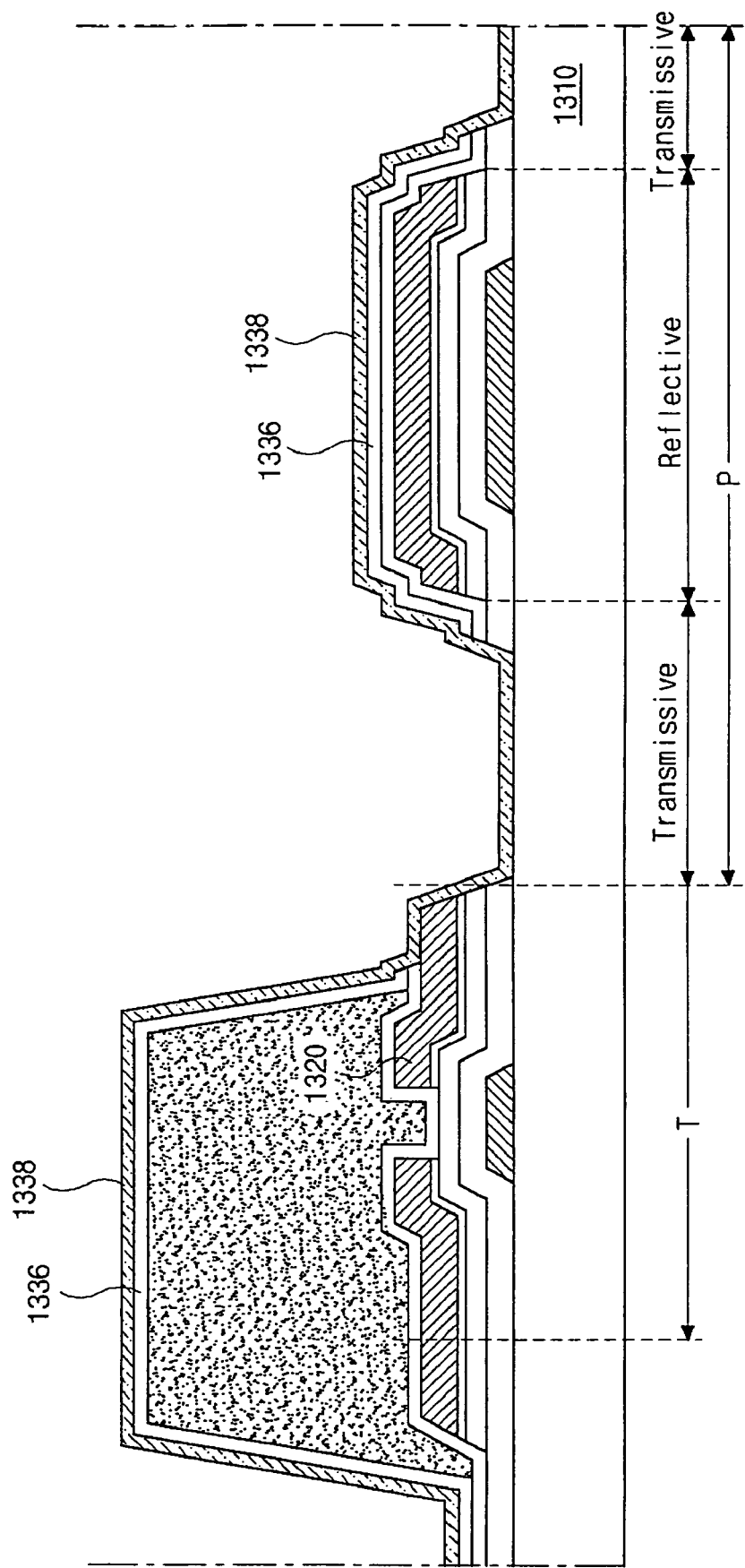

In FIG. 11F, a first transparent conductive layer 1338 may be formed over an entire surface of the substrate 1310 to cover the patterned second passivation layer 1336, thereby contacting the exposed portion of the drain electrode 1320. Further, the first transparent conductive layer 1338 may contact the substrate 1310 within the transmissive portion.

Figure 11G:
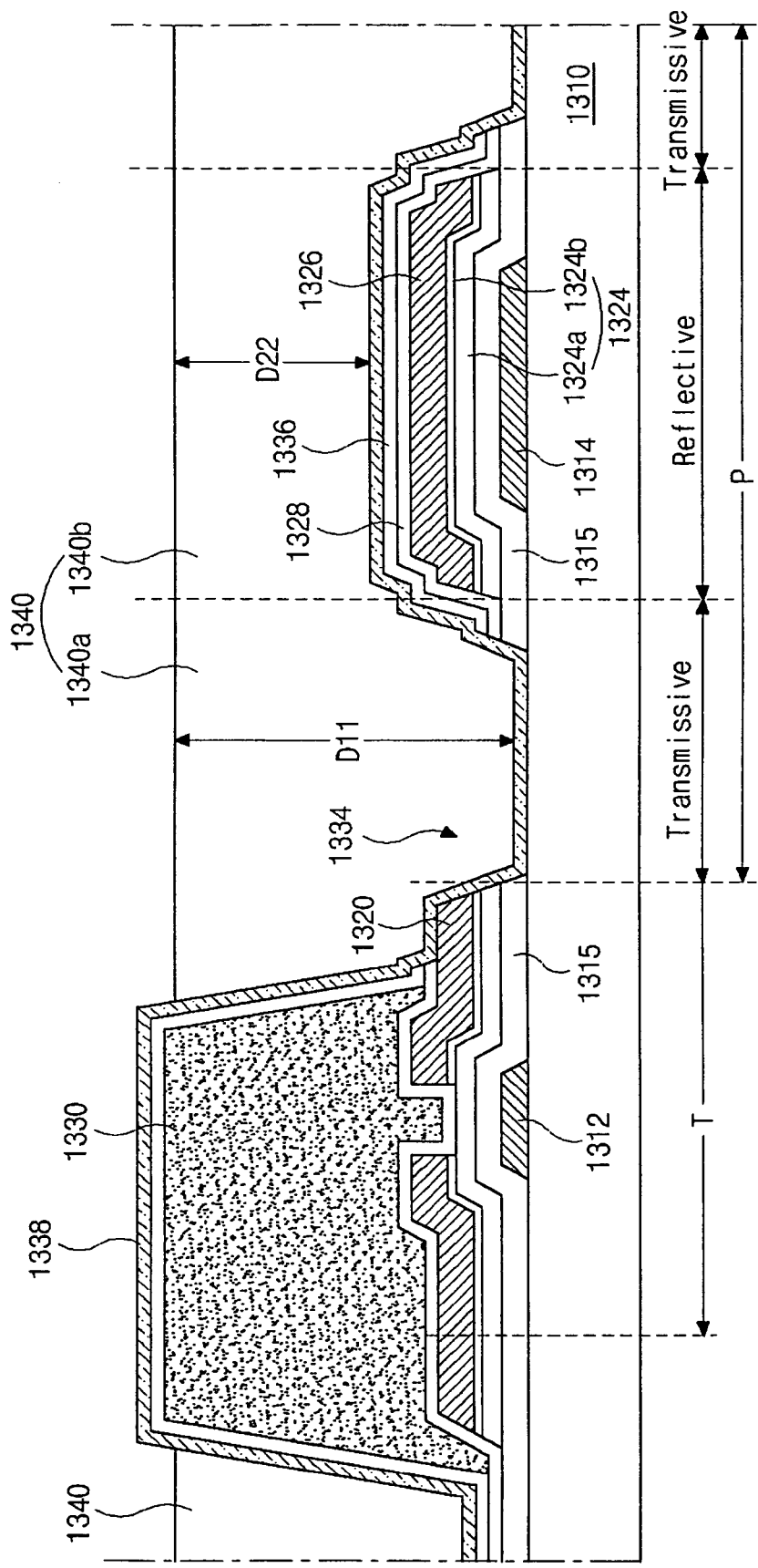

FIG. 11G shows an exemplary step of forming a color filter layer 1340 using a color resin. In FIG. 11G, the color resin may be first formed on the first transparent conductive layer 1338, and then patterned using a fifth mask process. Accordingly, the color filter 1340 may be disposed within the pixel region P. In addition, the black matrix 1330 may function as a barrier that separates the color filter from the color filter of the neighboring pixels. For example, the black matrix 1338 may border the neighboring color filters 1340.

The color filter 1340 may have one of red, green, and blue colors, and may be divided into two portions, such as a first portion 1340a and a second portion 1340b. The second portion 1340b may be disposed in the reflective portion where the first buffer pattern 1314, the patterned gate insulation layer 1315, the second buffer pattern 1324, the reflector 1326, and the patterned first and second passivation layers 1328 and 1336 may be disposed. The first portion 1340a of the color filter may be disposed in the transmissive portion of the pixel region P and over the edge portion of the drain electrode. The first portion 1340a may have a first thickness D11 and the second portion 1340b may have a second thickness D22, wherein the first thickness D11 may be significantly larger than the second thickness D22 due a lack of buffer patterns and insulation layers beneath the first portion 1340a. Thus, no light path differences exist between artificial light from the backlight device and ambient light from the surroundings, thereby increasing color reproduction of the color filter 1340.

Figure 11H:
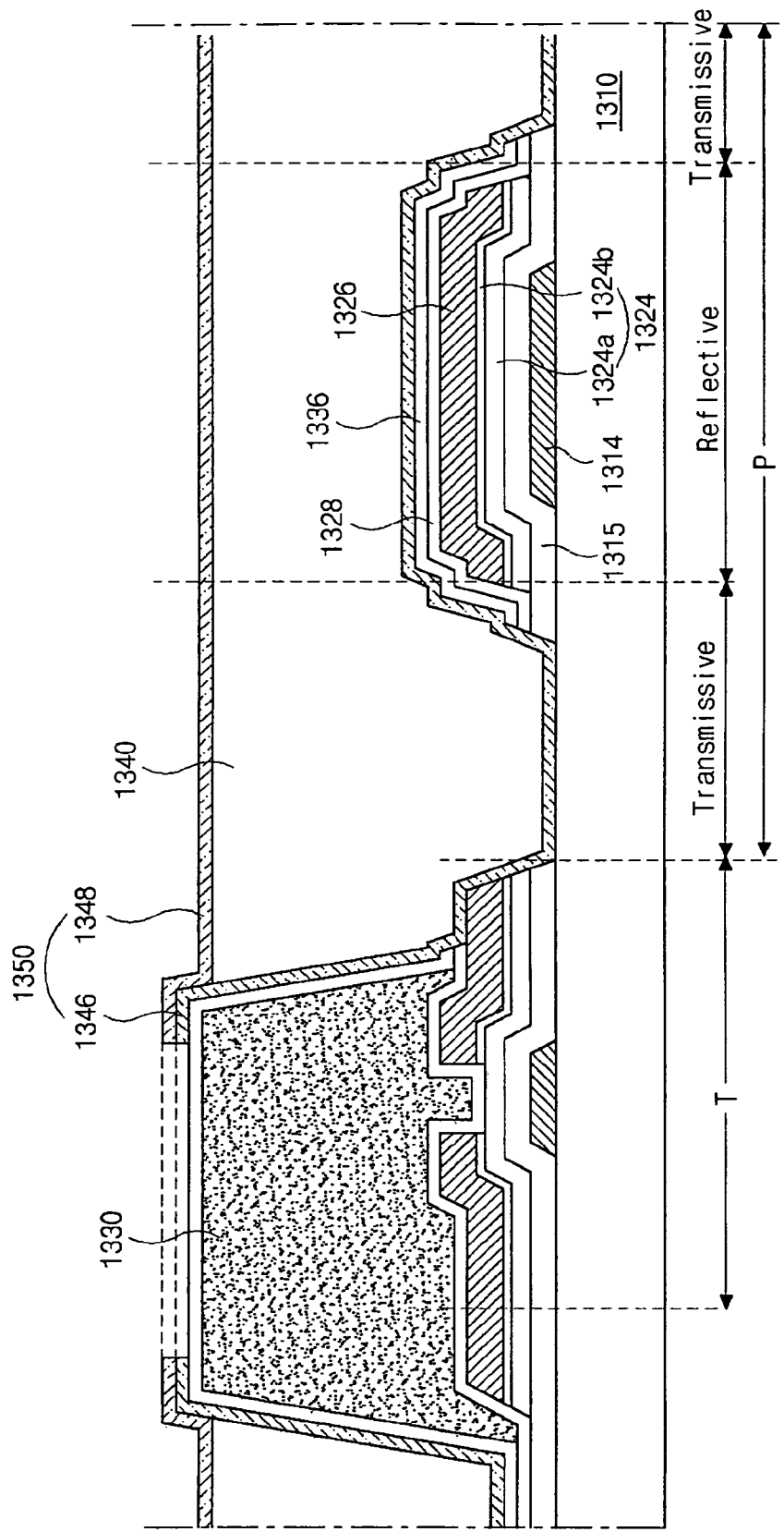

In FIG. 11H, a second transparent conductive layer may be formed over the entire surface of the substrate 1310 to cover the color filter 1340, and may contact the exposed portion of the first transparent conductive layer. Then, the first and second transparent conductive layers may be simultaneously patterned using a sixth mask process to form first and second transparent pixel electrodes 1346 and 1348 in the pixel region P. During the patterning process of the first and second transparent conductive layers, portions above the black matrix may be removed. Accordingly, the first and second transparent pixel electrodes 1346 and 1348 may constitute a pixel electrode 1350 that may be referred to as a sandwich pixel electrode since the color filter layer 1340 may be interposed between the first and second transparent pixel electrodes 1346 and 1348. In addition, the first and second transparent pixel electrodes 1346 and 1348 are formed of a transparent conductive material, such as indium tin oxide (ITO) or indium zinc oxide (IZO).

According to the present invention, since the reflector may be formed during the formation of a metal pattern of the thin film transistor, a process of forming the reflector may be omitted. In addition, since the buffer patterns formed during the formation of the thin film transistor may be disposed beneath the reflector, it may be possible to reduce differences of color reproduction in the reflective portion and in the transmissive portion, thereby improving the display quality of the transflective liquid crystal display device. Furthermore, since the reflector may be designed to have various geometrical shapes within the pixel region, it may be possible to control the ratio of the reflective portion to the transmissive portion. It will be apparent to those skilled in the art that various modifications and variations can be made in the transflective liquid crystal display device having color filter-on-thin film transistor (cot) structure of the present invention without departing from the spirit or scope of the inventions. Thus, it is intended that the present invention covers the modifications and variations of this invention provided they come within the scope of the appended claims and their equivalents.

What is claimed is:

1. A transflective liquid crystal display device, comprising:
a thin film transistor disposed at a corner of a pixel region, the thin film transistor including a gate electrode, a semiconductor layer, a source electrode, and a drain electrode;
a first passivation layer over the thin film transistor;
a reflector disposed in the pixel region and spaced apart from the thin film transistor, the reflector formed of the same material as one of the gate, source, and drain electrodes;
a color filter disposed within the pixel region, the color filter having one of red, green, and blue colors;
a black matrix over the first passivation layer along color filter borders of adjacent pixel regions;
a second passivation layer on the black matrix, the second passivation layer wrapping the black matrix with the first passivation layer; and
a pixel electrode formed of a transparent conductive material adjacent to the color filter, the pixel electrode having a first end portion contacting the drain electrode of the thin film transistor;
wherein the pixel region is divided into a reflective portion including the reflector and a transmissive portion absent of the reflector, the color filter has a first thickness in the transmissive portion and a second thickness in the reflective portion, and the first thickness is larger than the second thickness, and
wherein the pixel electrode includes a first transparent pixel electrode and a second transparent pixel electrode, the first transparent pixel electrode is disposed between the black matrix and the color filter and contacts the drain electrode, and the second transparent pixel electrode is on the color filter layer to contact the first transparent pixel electrode.

2. A transflective liquid crystal display device, comprising:
a thin film transistor disposed at a corner of a pixel region, the thin film transistor including a gate electrode, a semiconductor layer, a source electrode, and a drain electrode;
a reflector disposed in the pixel region and spaced apart from the thin film transistor, the reflector formed of the same material as one of the gate, source, and drain electrodes;
a color filter disposed within the pixel region, the color filter having one of red, green, and blue colors;
a black matrix over the thin film transistor along color filter borders of adjacent pixel regions; and
a pixel electrode formed of a transparent conductive material adjacent to the color filter, the pixel electrode having a first end portion contacting the drain electrode of the thin film transistor;
wherein the pixel region is divided into a reflective portion including the reflector and a transmissive portion absent of the reflector, wherein the transmissive portion surrounds the reflective portion and wherein the transmissive and reflective portions have a rectangular shape and diagonal lines of the transmissive portion cross diagonal lines of the reflective portion.

3. A transflective liquid crystal display device, comprising:
a substrate;
a gate electrode disposed in a thin film transistor region on the substrate;
a first buffer pattern disposed in a pixel region on the substrate and spaced apart from the gate electrode;
a gate insulation layer formed on the substrate to cover the gate electrode and the first buffer pattern;
a semiconductor layer on the gate insulation layer over the gate electrode;
a second buffer pattern formed of the same material as the semiconductor layer and formed at the same time as the semiconductor layer, the second buffer pattern disposed above the first buffer pattern in the pixel region;

source and drain electrodes formed on the semiconductor layer and space apart from each other, the source and drain electrodes have the same planar shape with the semiconductor layer except for a space between the source and drain electrodes;

a reflector on the second buffer pattern, the reflector is formed of the same material as the source and drain electrodes and has the same planar shape as the second buffer pattern;

a thin film transistor disposed in the thin film transistor region, the thin film transistor including the gate electrode, the semiconductor layer, and the source and drain electrodes;

a passivation layer covering the thin film transistor and the reflector, the passivation layer exposing an edge portion of the drain electrode; and a color filter disposed over an entire surface of the substrate on the passivation layer, the color filter having one of red, green, and blue colors and having a drain contact hole exposing the edge portion of the drain electrode; and a pixel electrode formed of a transparent conductive material and disposed over the color filter in the pixel region, the pixel electrode contacting the edge portion of the drain electrode through the drain contact hole, wherein the pixel region is divided into a reflective portion having the reflector and a transmissive portion absent of the reflector, the color filter has a first thickness in the transmissive portion and a second thickness in the reflective portion, and the first thickness is larger than the second thickness.

4. The device according to claim 3, further comprising a black matrix above the thin film transistor filter between the color filters of neighboring pixel regions.

5. The device according to claim 3, further comprising a black matrix above the pixel electrode covering the thin film transistor.

6. The device according to claim 3, further comprising a planarization layer between the color filter, the pixel electrode, and a black matrix on the planarization layer, the planarization layer has a contact hole corresponding to the drain contact hole, and the black matrix overlaps the thin film transistor.

7. The device according to claim 3, further comprising a black matrix above the thin film transistor filter between the adjacent color filters of neighboring pixel regions, and a planarization layer covering both the black matrix and the color filter.

* * * * *